United States Patent
Larson et al.

(10) Patent No.: US 6,301,247 B1
(45) Date of Patent: Oct. 9, 2001

(54) PAD AND CABLE GEOMETRIES FOR SPRING CLIP MOUNTING AND ELECTRICALLY CONNECTING FLAT FLEXIBLE MULTICONDUCTOR PRINTED CIRCUIT CABLES TO SWITCHING CHIPS ON SPACED-PARALLEL PLANAR MODULES

(75) Inventors: Brian Ralph Larson, Bayport; Charles Kryzak, Mendota Heights, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/426,501

(22) Filed: Oct. 26, 1999

Related U.S. Application Data

(63) Continuation-in-part of application No. 09/055,396, filed on Apr. 6, 1998, now Pat. No. 6,215,786.

(51) Int. Cl.[7] ...................................................... H04L 12/50
(52) U.S. Cl. ............................................. 370/387; 370/386
(58) Field of Search ..................................... 370/387–405, 370/244, 474, 386; 379/325; 703/1; 439/43, 620, 712, 344; 345/175–179; 335/131–133; 340/825.8; 200/540–542, 537, 247

(56) References Cited

U.S. PATENT DOCUMENTS

| | | | |
|---|---|---|---|
| 3,878,341 | * 4/1975 | Balde | 439/493 |
| 4,406,062 | * 9/1983 | Navarro | 439/493 |
| 4,659,872 | * 4/1987 | Dery et al. | 174/254 |
| 4,682,828 | * 7/1987 | Piper et al. | 439/493 |
| 4,705,482 | * 11/1987 | Endo et al. | 439/460 |
| 4,833,468 | * 5/1989 | Larson et al. | 370/386 |

\* cited by examiner

Primary Examiner—Wellington Chin
Assistant Examiner—Prenell Jones
(74) Attorney, Agent, or Firm—Glenn W. Bowen; Patrick M. Hogan

(57) ABSTRACT

Dense physical and electrical connection of (i) flat flexible multiconductor cables of the printed circuit or ribbon types, to (ii) to spaced-parallel planar modules, particularly to switching modules containing switching chips, is realized by (1) a particular connection geometry in combination with (2) a spring clip connector. Flat flexible multiconductor cables routed through free space either in (i) "X" and, optionally also, "Z" planes, or else in (ii) "Y" planes exclusively, have their conductors' ends stripped and bent 90° so as to lie upon conductive pads, arrayed along lines angled 45° to both the "X" and "Y" planes, located on the substrates of switching modules that are within "Z" planes. A substantially square, substantially planar, spring clip mounts and re-mounts to the substrate by, preferably, two tabs fitting in a corresponding two holes in the substrate, so as to hold exposed conductor ends of each cable bent 90° compressively against a portion of the arrayed conductive pads, making electrical connections.

15 Claims, 15 Drawing Sheets

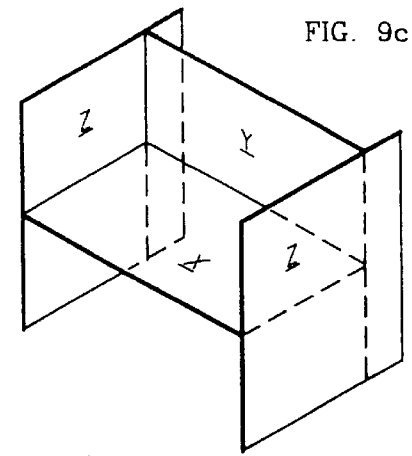
FIG. 9c
FIG. 9a
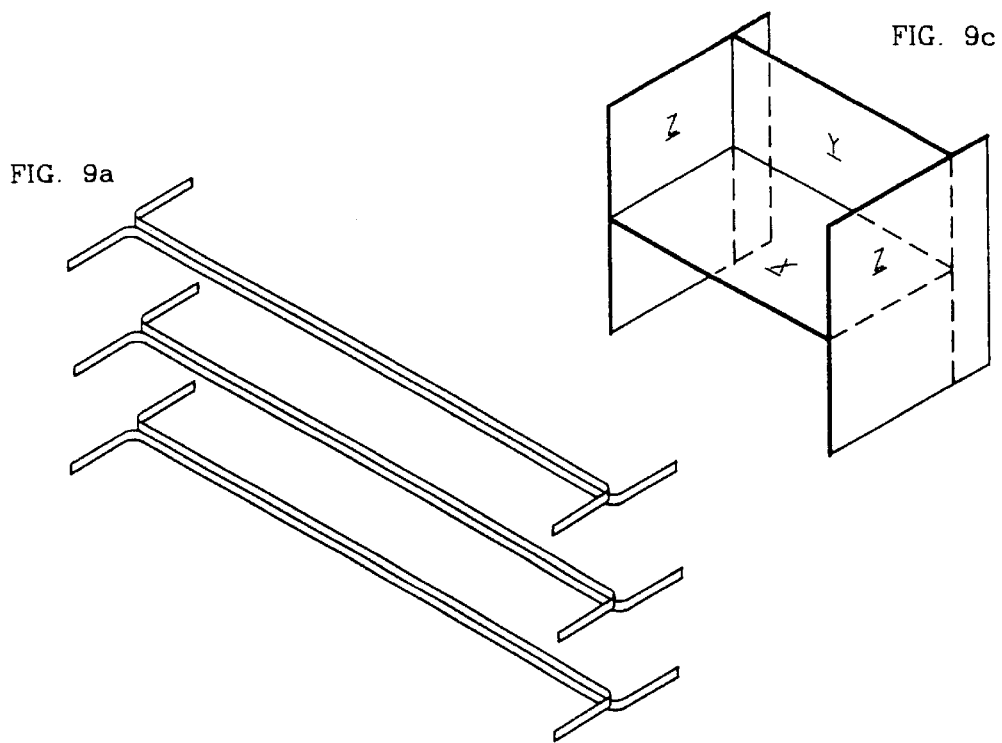
FIG. 9b

FIG. 13A
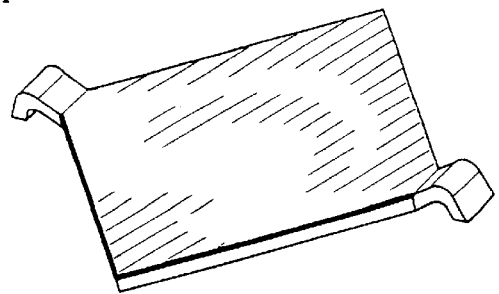
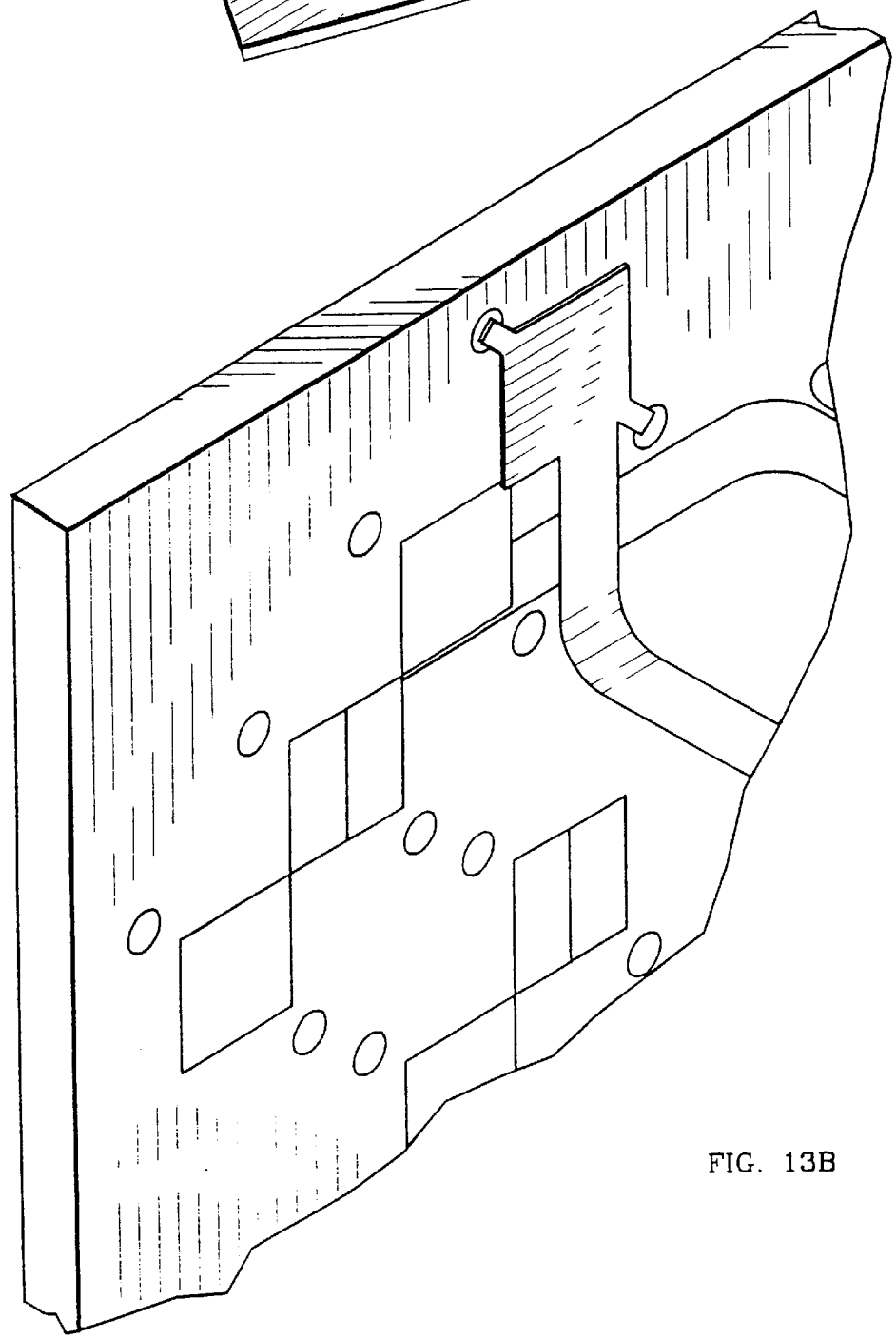
FIG. 13B

PAD AND CABLE GEOMETRIES FOR SPRING CLIP MOUNTING AND ELECTRICALLY CONNECTING FLAT FLEXIBLE MULTICONDUCTOR PRINTED CIRCUIT CABLES TO SWITCHING CHIPS ON SPACED-PARALLEL PLANAR MODULES

REFERENCE TO THE RELATED PATENT APPLICATIONS

The present patent application is related as a continuation in part to U.S. patent application Ser. No. 09/055,396 filed on Apr. 6, 1998, now U.S. Pat. No. 6,215,786, for IMPLEMENTATION OF MULTI-STAGE SWITCHING NETWORKS to the selfsame inventors as is the present application. The present application is also related to U.S. patent application Ser. No. 09/AAA,AAA filed on an even date herewith for THREE-DIMENSIONAL INTERCONNECTION GEOMETRIES FOR MULTI-STAGE SWITCHING NETWORKS USING FLEXIBLE PRINTED CIRCUIT CABLE CONNECTION BETWEEN MULTIPLE PLANES also to the selfsame inventors as is the present application. The contents of the related patent applications are incorporated herein by reference.

The first related patent application for IMPLEMENTATION OF MULTI-STAGE SWITCHING NETWORKS generally concerns the design of multi-stage interconnection switching networks that provide for the exchange of data between multiple electronic devices, and more particularly concerns the logic organization and layout of semiconductor die, and the associated wiring between such die, for implementing large and very large three-dimensional multi-stage interconnection networks. The multi-stage interconnection networks so designed are characterized by (i) an efficient logical organization, (ii) a very large size that typically interconnects of the order of 4096 and more communication ports, and (iii) a sophisticated, three-dimensional, interconnection geometry.

The second related patent application concerns the rule-based physical design layout of large and very large three-dimensional multi-stage interconnection networks based on (i) wired electrical interconnection proceeding through multiple parallel wires, normally in the form of flexible printed circuit cables, that extend in flat planes between (ii) multiple spaced-parallel planar modules, positioned orthogonally to the interconnecting flexible printed circuit cables, in which modules reside (iii) multiple switching chips that also constitute portions of the interconnection paths. This second related patent application is thus related to the first related patent application as a particular methodology for physically realizing a three-dimensional electrical interconnection—particularly between large numbers of points at high densities as epitomizes a very large multi-stage switching, or interconnection, network. Multi-stage interconnection, or switching, networks of this second related invention are characterized by an orderly, rule-based, co-location of a great number of interconnection wires—normally in the form of flat flexible multiconductor printed circuit cable— laid flat in parallel planes at high densities within small volumes between each of successive spaced-parallel planar modules (within which modules reside interconnection switching/routing chips, or dice). The physical appearance of such a multi-stage interconnection, or switching, network is (i) dense, and complex, but with (ii) an apparent underlying regularity, and order.

BACKGROUND OF THE INVENTION

1. Field of the Invention

The present invention generally concerns the physical and electrical connection of (i) flat multiconductor cables, normally in the form of flexible printed circuit cables, to (ii) planar modules, or tiles, particularly modules in which reside both switching chips and printed wiring that constitute a portion of the interconnection paths of three-dimensional multi-stage interconnection, or switching, networks, a remaining portion of the switching network's interconnection paths being constituted by the flexible printed circuit cables.

The present invention particularly concerns the dense physical and electrical connection of (i) large numbers of flat flexible printed circuit cables, to (ii) to spaced-parallel planar switching modules so as to implement large, and very large, scale interconnection, or switching, networks.

2. Description of the Prior Art

The present invention is concerned with the physical realization of multi-stage interconnection switching networks which provide for the efficient and rapid communication of data between large numbers of electronic devices, typically hundreds and even thousands of computer data processors. The multi-stage interconnection switching networks involve (i) large numbers of semiconductor switch dice located in (ii) spaced-parallel planar modules which comprise the switching stages, and (iii) associated electrical interconnection wiring between the planar-arrayed dice in each stage, forming thus a switching network in three dimensions.

The switching networks of the present invention are designed with switches, or switchpoints, that are located in logical rows and in logical columns, as is common. Such switching networks are commonly physically constructed with the physical switches—which are commonly implemented from semiconductor dice—that are arranged into physical ranks and physical files. When large numbers of electronic devices must be interconnected by even larger numbers of switches, the switches are commonly logically and physically arrayed as multiple stages. Because laying out each of the stages on the same plane soon becomes unwieldy large, each stage is laid out on a single plane, and the planes are stacked one atop another in three dimensions.

If, for smaller switching networks, all the switches, or switchpoints, are physically located in a common plane—such as on a single circuit panel or on a number of circuit panels adjacent to one another, then the interconnection wiring between the outputs and the inputs of the various switches of this circuit panel may clearly be accomplished in, or substantially in, the plane of the circuit panel. When several circuit panels are used, it is common to connect from one to the next by edge connectors. The several printed circuit panels may be located in a single plane, and the edge connections may thus also be in this plane. However, if the edge connections are made with flexible cable, including the multiconductor flexible flat cable commonly know as ribbon cable, as is common, then the panels may usefully be arrayed spaced-parallel to each other in a stack.

Although wiring has occasionally been made from central areal regions of one panel directly across to corresponding central areal regions of an adjacent parallel panel, at last two problems have beset making electrical connection directly from one panel to another in the volume between them while attempting to realize high density, and minimal communication delay, within a multi-stage switching network. If the interconnecting wires are permanently, or semi-permanently, affixed to the panels, such as by soldering the wire ends in vias in the panels, then the successive panels must be "laid up" in order during construction, and become effectively impossible to disassemble for maintenance, including so as to replace any chip switches (located on the panels) that have failed.

If the interconnecting wires—commonly in the form of printed circuit multiconductor, or ribbon, cables with exposed conductor/wire ends—are not to be placed into vias within the panels and soldered, then a reliable form of electrical connection, and electrical connector, is needed between the interconnecting wires and the transverse panels. Moreover, even if a suitable connector is found, the typically high wiring density between the panels tends to turn the volume between the panels into a "rat's nest", with physical conflicts between wires forcing the panels to greater separation and the interconnecting wires to greater lengths, and with an associated communications signal delay that is greater than would desirably be the case.

These problems have heretofore been so severe that free-space optical interconnections have been contemplated between panels of a stack for appreciably-sized multi-level switching network cross-connecting 256 nodes or more. Photons, being bosons, pass though each other in free space without appreciable cross-interference, and have thus been hypothesized to be more suitable for three-dimensional spatial-point to spatial-point communicative interconnection than are electrons, which, as fermions, strongly interfere with each other—whether or not carried on wires which, themselves exhibit spatial impermeability. Although there may yet be a point where three-dimensional optical interconnection, with all its overhead of transformation from and to the electrical signals presently used for computation and switching, becomes useful and even dominant, the present invention will be seen to concern good "old fashioned" point-to-point wiring, extending such wiring into multi-level networks of sizes heretofore believed highly impracticable, if not impossible, of being implemented by purely electrical connection.

The present invention will shortly been seen to contemplate a truly three-dimensional switching network where communication connections are made in the volume between adjacent parallel circuit panels, and along routes between panels which routes are transverse to the planes of the panels. In accordance with the present invention, the wiring between adjacent panels, although extremely dense and spatially sophisticated, is highly regular, and substantially devoid of spatial conflicts. In accordance with the second related invention, regular and reliable electrical connection may be made from the flat wiring circuits, or flexible printed circuit cables, located between adjacent panels and in planes transverse to the panels. Switching circuits are located in electrical dice upon, and co-planar with, the panels.

The three-dimensional switching network physical geometries of the present invention are suitable to implement diverse logical switching networks. Various prior art baseline switching networks, the reverse Banyan network, the Cantor network, the two-planed layered network, and many other of the layered networks that are described in U.S. Pat. No. 4,833,468 entitled LAYERED NETWORK, and which issued in the names of selected inventors of the present invention on May 23, 1989, are all examples of networks which may beneficially use the three-dimensional interconnection geometries of present invention.

However, the preferred wiring rules, patterns and topology of the present invention—i.e. the locations of the interconnection wires between the panel-mounted switches—are based upon "something" having been "done" with the layout of the selected logical switching network. What this "something" is that is "done" is taught within the first and second related patent applications. What is "done" in the layout of a switching network follows detailed rules, but is not too difficult to understand. Just why anything should be "done" and any rules should be followed—to make realizable an efficient physical geometry—will become increasingly clear when the results achievable by the design methodology, and by the present inventions, are explained in the present specification disclosure.

Although distinctly not part of the prior art—as the logical switching networks themselves are—the inventions of the related patents call for a (i) rotating, (ii) folding and (iii) squaring process on a logical network. This (i)–(iii) process substantially reduces the length of (wired) connections between, as ultimately physically laid out, the physical switches within the physical network. In other words, the logical network is selectively "pre-conditioned" by moving the logical switching elements around (totally without change to the logical function of these elements, nor of the multi-level switching network that they serve to implement) so as to make more efficient—even possible—the (wired) implementation of the physical switching network which is the concern of the present invention.

Moreover, the approach of the related inventions will be seen to permit the construction of very large networks by combining smaller networks. In networks constructed with the rule-based geometries of the related inventions, the length of the longest connections between switches will be found to be proportional to the square root of the number of ports provided by the network.

Furthermore, once the power of this approach—"pre-conditioning" a logical multi-stage switching network so as to then best permit subsequently physically realizing a real-world multi-stage switching network by certain rule-based design such as ultimately supports the elegant interconnection geometries of the present invention—is fully understood, it will be realized that the approach of the present and related inventions are of general applicability to implementing large and very large multi-stage switching networks.

In particular, the layered network of the U.S. Pat. No. 4,833,468 has, as a design, a number of desirable features. However, the layered network design of this patent was initially implemented in accordance with precise algorithms so that each network load size required a unique wiring topology and various different kinds of switching panels. This U.S. Pat. No. 4,833,468 is hereby incorporated by reference into this document.

The second related invention, and this invention, show how to physically implement, by way of example, a layered network of this previous U.S. Pat. No. 4,833,468 in a regular, scalable, form. In other words, the same parts may be used to build large, very large, and stupendously large switching networks. (The present and related inventions are only tangentially concerned with medium and small switching networks connecting a few score devices).

Although a layered network from the former U.S. Pat. No. 4,833,468 is used as an example to illustrate the present and related inventions, the present invention may be applied to the various other types of multiple-stage switching networks, including (i) baseline, (ii) Banyan and (iii) Cantor networks, (iv) all the layered networks that may be constructed in accordance with the teachings of U.S. Pat. No. 4,833,468, and (v) still other types of switching networks.

SUMMARY OF THE INVENTION

The present invention concerns the dense physical and electrical connection of (i) flat flexible multiconductor printed circuit cables, to (ii) to spaced-parallel planar modules, particularly to modules containing switching chips (i.e., switching modules) so as to, by electrical interconnection of multiple spaced-parallel switching modules, implement large scale, and very large scale, interconnection, or switching, networks. Such switching networks serve, inter alia, to connect large numbers of computer processors to perform massively parallel processing.

The large scale, and very Large scale, switching networks that are in part dependent upon the physical and electrical connection of the present invention are both (i) logically efficient and nonblocking (i.e., they are possessed of a crosspoint switch architecture), and (ii) very fast (i.e., they are electrically compact, with but modest length communication paths capable of transmitting high frequency signals). The switching networks also enjoy, in accordance with the present and related inventions, a physical and electrical structure that is each of economic, reliable, manufacturable, orderly, and maintainable.

Full interconnection of, by way of example, 4096 communication ports may be realized in 1536 switching modules containing some 24,576 switching chips by use of some 50,688 multiconductor-cable-to-switching-module connections in accordance with the present invention. All modules and flexible printed circuit cables are located in a cube some 64 inches on a side with no port-to-port electrical path longer than about 38 inches. If each port is, for example, 64 bits wide—requiring 64 data lines plus 64 ground lines for high speed transmission—then the 50,688 multiconductor cable connections must handle some 6,488,064 signal and ground paths. That nearly 6.5 million electrical connections may be made at all within a cube some 5.3 feet on a side is difficult, let alone that these 6M+ connections should be made economically, and with adequate reliability.

In order to realize this performance, the present invention contemplates not only a particular physical and electrical (inter)connection structure, but also a rule-based physical and electrical (inter)connection geometry. The (i) (inter)connection structure and (ii) rule-based interconnection geometry are in combination efficient, reliable, regular, and, arguably, elegant in a subtle way that is often recognized only upon careful study of diagrams that may initially appear complex.

1. Physical Geometries, and Connector Structures, for the Physical and Electrical Connection of Flat Flexible Multiconductor Printed Circuit Cable and Planar Modules The present invention contemplates certain physical geometries, and a matching connector structure, for the electrical connection of (i) flat, or planar, flexible multiconductor printed circuit cables at their (ii) exposed electrical conductor ends to (ii) pads—which pads are further connected to circuit traces and then to chips—that are located on spaced-parallel planar modules mounting chips. The flat flexible multiconductor printed circuit cables, and the connection geometries and connectors that are the subject of the present invention, most commonly serve, along with the pads and the circuit traces, to electrically interconnect switching chips, although the interconnection of memory chips and other chip types is possible.

The flat flexible multiconductor printed circuit cables, connections, pads, traces and switching chips form in aggregate the signal paths of a multi-stage interconnection, or switching, network.

(It is possible to use ribbon cables, containing multiple wires, in lieu of flat flexible multiconductor printed circuit cables, containing multiple circuit traces, or lands. In such case the exposed conductor ends are spoken of as being "stripped wires". The terms "flexible printed circuit cables" and "ribbon cables", and "lands" or "traces" and "wires", will be variously used throughout this specification, and a practitioner of the electrical arts will recognize that the concepts are the same.)

The particular connection geometry contemplated by the present invention will imminently be seen to concern certain (1) two mutually orthogonal sets of parallel planes, in the planes of which two sets exist the substantial portions of all the flat flexible printed circuit cables, and (2) a third set of parallel planes—mutually orthogonal to both the other two sets—in which panels are present (2a) the printed circuit cable wire ends, (2b) the modules, (2c) "diagonal" lines (in the planes of the modules) along which the pads are arrayed, and (2d) a particular geometry of connectible, and connected, points upon each pad. The purpose of the rigorously prescribed connection geometry is to preserve such order as is absolutely necessary to realize the complex signal routings, and the electrical interconnections, of a switching network within but a small volume at high density, and with short signal paths suitable to carry high frequency signals.

The present invention will also imminently be seen to contemplate a spring clip connector for (i) physically securing and (ii) electrically connecting the arrayed exposed conductor ends of a flat flexible multiconductor printed circuit cable (equivalently, the stripped wire ends of a ribbon cable) en masse, both the (i) securing and the (ii) connecting being to conductive pads that are upon the substrate of a planar module. Both the (i) securing and the (ii) connecting are preferably by pressure force.

The connection geometry of the present invention could support some alternative connector and/or connection. For example, the multiconductor cable conductor ends could be soldered to the modules. However, the purpose of the preferred spring clip connector is to permit field disassembly and reassembly of the switching network—such as may from time to time be necessary for repair, including replacement of failed switching chips that are upon the switching modules.

1.1 A Particular Spatial Geometry of Routing Flat Flexible Multiconductor Printed Circuit Cables in Free Space Between Pads Located On Spaced-Parallel Planar Modules (In Which Modules Commonly Reside Signal-Switching Chips)

The (i) physical attachment, and (ii) electrical connection, geometries of the present invention are, although suitable for computer backplane busses and the like, particularly concerned with realizing large, and very large, three-dimensional multi-stage switching networks. The networks or primary interest are is characterized by massive numbers of electrical connections in a small volume, typically and by way of example more than $6.4 \times 10^6$ such connections in a volume of less than 152 cubic feet.

In accordance with the present invention exposed conductors at both ends of a planar multiconductor printed circuit cable, or a ribbon cable, are attached, and electrically connected, to conductive pads upon spaced-parallel planar modules. The conductive pads connect via printed circuit traces to signal-switching chips within the planar modules. The (i) flat multiconductor, or ribbon, cables, (ii) the pads, (iii) the traces and (iv) the signal-switching chips are all parts of the interconnection paths of a multi-stage interconnection, or switching, network.

All flexible printed circuit cables are routed through space between the spaced-parallel modules, which modules are located in parallel planes called the "planes of Z", in accordance with strict rules.

After connecting to a pad upon a module, some of the flexible printed circuit cables—the flexible printed circuit cables of a "first group"—may be routed alongside, and adjacent to, the module, in and along an axis lying in one of a first set of parallel planes called the planes of "X", Then, an appropriate extension being reached, the cable bends 90° and is routed in an associated one plane of first set of parallel planes called the "planes of Y". The cable will so be routed straight all the way to the next adjacent module in whatsoever "plane of Y" it resides; it will never leave this plane. When the cable of the first group gets to the adjacent module, it will again bend 90°, and can again run in a (different) "plane of X" until it reaches its destination pad. All this sounds more complicated than it is. A flat flexible multiconductor cable of the first group is simply routed in a direction determined by its affixation at one end to a pad upon a module, bent and extended across the space between modules, and bent again when reaching the destination module until the cables other end is affixed at a pad on that module. There is no twisting nor any torsioning of the flat muticonductor cable; there is bending only.

The association between cable and plane(s) need not be unique; sometimes plural cables of the first group will be routed in different portions of a single "plane of Y" between the modules. However, once entering into its associated "plane of Y" between the modules a flat flexible multiconductor cable of the first group never, never, leaves this plane. Moreover, the plural cables of the first group all run along parallel axes, each located in some parallel "plane of X", at the surfaces of the modules.

Some small thought about this routing will reveal that the cables of this first group never change their "plane of Y". Thus the cables of his first group, although quite "flexible" (no pun intended) to connect pads on modules that are within a single "plane of X", cannot connect just any pads module-to-module, but must connect pads that are in a spatial relationship (to wit: the same "plane of Y"). What this means in terms of implementing the logical structure of the switch is that these first group cables are the ones that, in the logic diagrams of the switch, look to proceed "straight across", switchpoint to switchpoint.

Now comes an important concept. The locations of the cables of this "first group"—in the "planes of X" at the surfaces of the modules and within the "planes of Y" between the modules—will be found to be between the locations of cables of a "second group"—next discussed— that can be and are (at least partially) within the "planes of X"—and vice versa! The cables of the two groups "interleave" each other in three-dimensional, multi-planar, space! This concept may momentarily be left in abeyance while the routing of cables in the "second group" is discussed.

Routing of flexible printed circuit cables of a "second group" is more complex. The flexible printed circuit cables of this second group are but infrequently routed at all along the surfaces of the modules where they connect to pads. In other words, connection to a pad being made, a typical cable of this second group immediately bends at a right angle and leaves the surface of the module, heading into the space between the modules. There are exceptions, and there are cables of the second group that run a slight distance in a "plane of Y" at and along a surface of a module, but this is due mostly to the fact that the arrayed pads (as connect to all the many switchpoint chips) are not completely symmetrical and are, indeed, in the pattern of a rectangle as opposed to a square (because, ultimately, the switchpoint chips must have power and cooling as well as signals).

One bending 90° and "springing" off the module having the pad at which it has just made connection, a cable of the second group may simply be routed in some associated one plane of a second set of parallel planes called the "planes of X". However, as the far more prevalent and interesting case, flexible printed circuit cables of this second group are commonly routed in (2a) an associated first plane of the first set of parallel planes—the "planes of X"—and then, additionally, in (2b) a single plane—called a "plane of Z"—that is commonly located midway between a pair of spaced-parallel modules (and which is parallel the "planes of Z" in which all modules exist), and then, finally, in (2c) an, associated second plane of the first set-of parallel planes— another one of the "planes of X". In other words, an individual multiconductor cable of this "first group" (i) is routed first in some first "plane of X" from a module to a location midway to an adjacent module, (ii) is then bent and routed in the "plane of Z" to some second "plane of X", and (iii) is then bent into this second "plane of X" where it continues until reaching the second module.

The second group cable routing in the "planes of X" is everywhere between the "planes of Y". The second group cable routing in the "plane of Z" is everywhere parallel to all the "planes of Y".

All of the "planes of X" are everywhere perpendicular to all the "planes of Y" are everywhere perpendicular to all the "planes of Z" (and to the "plane of Z"). It is not offensive that cables in "planes of X" or "planes of Y" should "run into" modules in "planes of Z": that is how they are connected.

It might be thought that having cables in both "planes of X" and "planes of Y" that are everywhere perpendicular to each other would cause conflict. However, the routing of cables of the second group, although within the "planes of X", is non-conflicting with the "planes of Y" (let alone any cables that may be within these "planes of Y"). Meanwhile, and as stated above, the routing of cables of the first group within the "planes of Y" is non-conflicting with the routing of the cables of the second group (at least partially) within the "planes of X"—and vice versa.

The rule-based routing makes that a flat flexible multiconductor printed circuit cable of the first group never cuts, or crosses, a like cable of the second group, and vice versa.

The power of this physical geometry may latter be grasped by reference to the drawings. Essentially the flexible printed circuit cables of the "first group"—the module-to-module extent of all of which "first group" cables are exclusively within the parallel "planes of Y"—collectively occupy such space between the modules as appears similar to thin parallel sheets, or walls, of regular spacing located between the spaced-parallel modules. There exist substantial volumes between these thin sheets, or walls, formed by the flexible printed circuit cables of the "first group". It is into these volumes that the bending flexible printed circuit cables of the "second group" are placed. Ultimately everything gets connected between the spaced-parallel modules by flexible printed circuit cables none of which ever cross, and all of which proceed along paths an orderly, rule-based, fashion.

Quite incredibly, but less visually distinctive in the drawings because each "first group" cable is all in one associated "plane of Y" while most "second group" cables are distributed over, inter alia, two "planes of X", the same thing can be said in reverse. Namely, the flexible printed circuit cables of the "second group"—the module-to-module extent of all of which "second group" cables are exclusively within the one or two parallel "planes of X"—collectively occupy such space between the modules as also appears similar to thin parallel sheets, or walls, of regular spacing. There exist substantial volumes between these thin sheets, or walls, formed by the flexible printed circuit cables of the "second group". It is into these volumes that the bending flexible printed circuit cables of the "first group" are placed.

This is quite a "trick" if it can be accomplished: the flat multiconductor, ribbon, cables of each group fit between the cables of the other group. There is even room for a "mid-module" "crossover" for the cables of one group (the second group). How is this desirable geometry realized?.

It must now first be understood that this geometry, which is well suited for dense cable packing and electrical interconnection, can only exist because the logic, and the layout (which are two separate things), of the switched paths of the multi-stage interconnection, or switching, network have themselves both followed strict rules. These rules are the subjects of the related patent applications. As might be guessed (since the cables of the first group were those corresponding to the straight paths within the logic diagrams), the cables of the second group, with their slightly more complex routing, realize the diagonal connections of the logic diagrams.

1.2 A Particular Spatial Geometry of Attaching, and Electrically Connecting, the Exposed Conductor Ends of Flat Flexible Multiconductor Printed Circuit Cable to Pads On Spaced-Parallel Planar Modules (In Which Modules Commonly Reside Signal-Switching Chips)

It must now be understood that there is a "price to pay" for this dense, but reasonably orderly, routing of the flexible printed circuit cables. This price is a certain congestion at the (interconnected) modules. It is no small matter to get all the in flexible printed circuit cables—which are, of course, in their substantial portions exclusively in the "planes of X" of in the "planes of Y"—physically attached, and electrically connected, in a but small contact areas on the modules— which modules are, of course, located spaced-parallel in the "planes of Z". The interconnection problem is, it is submitted, especially complex if it is realized that a switching chip that is within a switching module, or even a wired interconnection, may fail, and that the entire multi-stage interconnection, or switching, network ($6.4 \times 10^6$ interconnections in 152 cubic feet) may have to be field disassembled for maintenance and repair.

To start towards the solution, the ends of each flexible printed circuit cable are bent perpendicular (i.e., 90°) so as to lie within the plane of a connected module. (For cables of the first group it may reside within this plane for quite an extent, and for cables of the second group nary at all.) Remember, the modules are in the parallel "planes of Z" and are thus everywhere orthogonal to both sets of planes—the "planes of X" and the "planes of Y"—in which are present the substantial expanses of the flexible printed circuit cables. These conductive ends lie against the planar modules, and are therefore themselves in the planes of the modules, or in the "planes of Z". (These cable ends in the "planes of Z" are why it is said only that the "substantial" portions, or expanses, of the flexible printed circuit cables are in the "planes of X" or the "planes of Y".)

In of itself, this bending of the flat flexible multiconductor printed circuit cables, and of their exposed conductive ends, solves nothing. If anything, there are now at least some conductive ends needing connection at the planar modules which conductive ends are, by groups and by bundles, at right angles to each other.

The solution is as follows.

First, all the exposed conductor ends of each multiconductor cable (in either a "plane of X" or a "plane of Y") are connected to group of pads within a single area; to a "superpad" as it were. The pads lie along a straight line; the "superpads" lie along the same line (which line is, of course, in the plane of the module). This line is at a 45° diagonal to both the "planes of X" and the "planes of Y". Since the modules are normally rectangular, with two opposed sides (i.e., edges) that are orthogonal to the "planes of X" and two sides that are orthogonal to the "planes of Y", then the line of the pads, and of the "superpads", is also at a 45° diagonal to the sides of the modules.

Such conductive ends of a single multiconductor cable as are all orthogonal to the "planes of X" are suitably connectable to and along a line of the pads at the location of some "superpad". Alternatively, such conductive ends of some other multiconductor cable as are all orthogonal to the "planes of Y" are also suitably connectable to the same line of the pads at the location of the same "superpad". Of course, any particular multiconductor cable, and its exposed conductive ends, correctly connects only to the pads of one particular superpad (if the logical connections of the multi-point multi-stage interconnection, or switching, network are to be correctly realized). The operative principle is simply that a flat flexible multiconductor printed circuit cable, and its exposed conductive ends, of either orientation may be accommodated upon the same diagonal pads of the same "superpad". Accordingly, by locating the pads, and the "superpads", "on the diagonal", an identical pad and circuit trace geometry on each switching module accommodates all connections to both routings of the flexible printed circuit cables.

The proper location of the pads—along the "diagonal" as if it were—is not alone sufficient to permit "straight on" connection, with no torsioning nor any twisting of the flat flexible multiconductor printed circuit cables anywhere, including at point of attachment. This is accomplished by making the connection pattern—the pattern of connectible, and connected points—on both the module's pad, and the flat flexible multiconductor printed circuit cable's exposed end conductors, to have 90° rotational symmetry.

The "upshot" of all this "angling" and "rotational symmetry" is exactly what might be expected: everything connects to everything not only without spatial physical conflict, but in a "straight on"—if not straightforward— manner where not one single conductor is torsioned, pulled or squashed. This is more than good design; it is necessary design. With over one-million connections in larger embodiments of the switch, it is essential that every physical piece, and every cable, and every wire, and every connection, should "fit like a glove". Exactly how this final step— connection—is accomplished is the subject of the next section.

1.3 A Particular Connector for Physically and Electrically Connecting the Stripped Wire Ends of Flexible Planar Multiconductor Printed Circuit Cable to Pads On Spaced-Parallel Planar Modules (In Which Modules Commonly Reside Signal-Switching Chips)

In accordance with the present invention, the exposed conductor ends of each flat (or planar) flexible multiconductor printed circuit cable (howsoever routed) are held to the pads (at the position of a superpad) by a special, square, spring clip that overlies the entire "superpad". Both mechanical affixation, and electrical interconnection, is accomplished by pressure forces developed by this spring clip.

The manner of the affixation of the square spring clip-to the module is interesting. If the spring clip was to be affixed at or along its opposed sides (let alone along all its sides) then it would hazard interference with cables, and cable conductor ends, approaching the superpad from the direction of that side. Likewise, the spring clip is preferably not affixed to the module at all four of its corners lest interference with the diagonal line of pads be hazarded.

The spring clip is preferably affixed to the module, securing the exposed conductor ends of a multiconductor cable under its major surface, by tabs that are located each of two-opposed corners. These tabs engage complimentary holes within the substrate of the module. The two-tab-mounted spring clip may be both mounted and removed by use of a simple, pliers-like, hand tool.

2. A Method of Connecting Flat Flexible Multiconductor Printed Circuit Cables to a Substrate Accordingly, in one of its aspects the present invention may be embodied in a method of electrically connecting at and to a substrate located in a first, Z, plane each of plural planar flexible multiconductor cables. At least one of the cables is located in a second, X, plane, and at least another one of the cables is located in a third, Y, plane where the planes X, Y and Z are everywhere perpendicular to each other.

The method includes exposing the conductor ends of each planar multiconductor cable.

At a location at or before the exposed conductor ends of each planar cable, the planar cables are bent perpendicular. The resulting portion of the cable closest to its exposed conductors' ends called the bent portion.

Electrically conductive pads on the substrate are arrayed to lie along a straight line in the first, Z, plane which line is at a 45° diagonal both to the second, X, plane and to the third, Y, plane. The separation of the pads in both (i) a direction of the intersection of the first, Z, plane and the second, X, plane, and also in (ii) a direction of the intersection of the first Z, plane and the third, Y, plane, corresponds to the separation of conductors within each multiconductor cable.

The exposed conductor ends of each cable's bent end portion—whether a remaining, non-bent-end portion of the associated ribbon cable lies in the second, X, plane or in the third, Y, plane—are placed so as to lie against some associated ones of the pads lying along the diagonal straight line.

Electrical connection is made between a first pattern of connectable points the multiple conductors of each cable and a compatible second pattern of connection points at a proximately located associated one of the pads.

This method of connecting to pads lying along a diagonal line permits, inter alia, that electrical connection in the Z plane may be realized to electrical cables, duly bent, extending in both X and in Y planes.

In the method a first pattern of connectible points of the exposed conductor ends on each and all of the multiconductor cables is preferably not merely "compatible" with a second pattern of connection points at a proximately located associated one of the pads—as is necessary to permit electrical connection at all—but the first pattern also exhibits 90° rotational symmetry to the second pattern, and vice versa, making that a cable extending in either an X, or a Y, plane may be connected to pads of the same geometry. By this geometry connection at the pads upon the substrate in the Z plane is regular and orderly no matter whether a connected multiconductor cable extends in the X, or in the Y, plane. The connecting is preferably by holding the exposed conductor ends of each cable against its associated portion of the pads under spring force. More preferably, this holding transpires by mounting a spring clip to the substrate in position over the exposed conductor ends of each cable, and over a portion of the pads associated with the exposed conductor ends of each cable, so as to force the exposed conductor ends of each cable against its associated portion of the pads, making pressured electrical connection between the conductor ends and the pads.

3. Geometry of the Mechanical and Electrical Interconnection of Flat Flexible Multiconductor Cables to Pads Upon a Substrate In another of its aspects the present invention may be considered to be embodied in an electrical interconnection between a substrate located in a first, Z, plane and exposed conductor ends of each of two planar flexible multiconductor cables. One of the flexible multiconductor cables is located in a second, X, plane while the other one of which flexible printed circuit cables is located in a third, Y, plane. The planes X, Y and Z are everywhere perpendicular to each other.

In this cables-to-substrate electrical interconnection geometry end regions of those planar flexible multiconductor cables that are located in the second, X, plane, and also those planar flexible multiconductor cable that are located in the third, Y, plane, are both respectively bent perpendicular out of the X plane, and out of the Y plane. Resultantly, the exposed conductor ends of the end regions of each cable lie against the substrate and over pad regions in the first, Z, plane.

Electrically conductive pad regions on the substrate are arrayed to lie along a straight line in the first, Z, plane—which line is at a 45° diagonal both to the second, X, plane and to the third, Y, plane. The separation of the pads in both (i) a direction of the intersection of the first, Z, plane and the second, X, plane, and also in (ii) a direction of the intersection of the first, Z, plane and the third, Y, plane, corresponds to a separation of conductors within each multiconductor cable.

Furthermore, electrically connectible points at pad regions are in a pattern having a 90° rotational symmetry to a like pattern of exposed conductors at the end of each multiconductor cable.

Electrical connection is made between the pattern of exposed conductor ends of each cable—whether a cable the unbent portion of which lies in the second, X, plane or a cable the unbent portion of which lies in the third, Y, plane—and a corresponding pattern of connectible points on some associated portion of the pads that lie along the diagonal straight line. Thus pads lying along the diagonal straight line in the first, Z, plane of a substrate suffice to connect both flexible multiconductor cables located both in a second, X, plane, and also in a third, Y, plane. Moreover, because of 90° rotational symmetry between connectible exposed conductor end points and substrate pad points, the connections of cables, duly bent, located in both the second, X, plane and also in the third, Y, plane is "straight on", with no-bending nor any torsioning of any cable despite that cables extend in different perpendicular planes!

4. A Cables-to-substrate Electrical Interconnection Geometry Supporting Use of a Spring Clip Connector, and Vice Versa In yet another of its aspects the present invention may be considered to be embodied in a particular cables-to-substrate electrical interconnection geometry where a spring clip is mounted to the substrate in position over the exposed conductor ends of each cable, and over a portion of the pads associated with the exposed conductor ends of each ribbon cable, so as to force the exposed conductor ends of each cable against its associated portion of the pads, therein making pressured electrical connection between the exposed conductor ends and the pads.

The spring clip connecter is particularly suitable to connect a flat multiconductor cable to a staircase pattern of conductive pads—spaced to separation in the direction of each of two imaginary perpendicular axis equal with a separation between conductors within the cable—upon a substrate. The multiconductor-cable-to-conductive-pads connector then assumes the form of a spring clip in the shape substantially of a square of substantially planar material. One diagonal of the substantial square subtends the staircase pattern of conductive pads. The spring clip has mounting features suitable to mount its substantially planar body to the substrate. These mounting features are located at opposite corners of the substantial square along its other, remaining, diagonal.

The spring clip when mounted to the substrate thus provides by action of its mounting features a spring force against the substrate over its substantially square area. When electrically conductive conductor ends of a multiconductor cable are placed between the spring clip and the substrate from a direction perpendicular to any side of the substantial square, and when the spring clip is mounted to the substrate, then these conductive ends are held by spring force in electrical contact with the conductive pads arrayed in the staircase pattern.

Notably, no interference is presented to the electrical contact between the ribbon cable's conductive ends and the substrate's conductive pads by the mounting features of the spring clip.

In detail, the spring clip's mounting features preferably consist of tabs anchored within complimentary holes within the substrate. The spring clip is then, selectively mountable, de-mountable, and re-mountable in its position holding by spring force the cable's conductive ends in electrical contact with the substrate's conductive pads.

5. Routinq of Flat Flexible Multiconductor Cables

In yet another of its aspects the present invention may be considered to be embodied in a particular, improved, routing of flat flexible multiconductor cables.

The routing is employed in an electrical device having electrical circuitry on each of at least two spaced-parallel panels located in a set of parallel planes called the planes of Z. This circuitry is electrically connected by flat flexible multiconductor cables routed through free space between the spaced-parallel panels.

In the improved routing flat flexible multiconductor cables of a first group, each of which cables extends between pads upon adjacent panels, are routed between pads upon adjacent panels. This routing is (i) in a first plane of Z proximately to one adjacent panel along an axis formed by intersection of one of a set of parallel planes, called the planes of X, with a plane of Z, and then (ii) bending 90°, in a respective one plane of a set of parallel planes called the planes of Y along anaxis formed by the intersection of the same one plane of X now with the one plane of Y, and then (iii) bending 90°, in a second plane of Z proximately to the other adjacent panel along an axis formed by intersection of the same one plane of X now with the second plane of Z. Cables of this first group are thus routed in a first associated plane of Z, a single associated plane of Y between panels, and a second associated plane or Z, all the while along axis formed by intersection of a single plane of X.

Meanwhile, flat flexible multiconductor cables of a second group—each of which also extends between pads on adjacent panels —are routed between pads upon adjacent panels (i) in a first plane of Z at one of the adjacent panels along an axis formed by intersection of the plane of Z with one of the planes of Y, and then (ii) bending 90°, in a first plane of X along an axis formed by intersection of this first plane of X with the one plane of Y, and then (iii) bending 90°, in a second plane of Z that is parallel to the planes of Z where reside the panels but that is located between the adjacent panels, this routing in this second plane of Z being along an axis formed by intersection of this second plane of Z and the one plane of Y, and then (iv) bending 90°, in a second plane of X along an axis formed by intersection of this second plane of X with the one plane of Y, and then (v) bending 90°, in a third plane of Z at the adjacent panel, this routing being along a Y axis formed by intersection of the third plane of Z with the one plane of Y. Cables of this second group are thus routed in a first associated plane of Z, in a first associated plane of X, in a second associated plane of Z, in a second associated plane of X, and in a third associated plane of Z—all the while along axis formed by intersection of a single plane of Y.

In this routing all the planes of X are everywhere perpendicular to all the planes of Y are everywhere perpendicular to all the planes of Z. Because (i) all cables of the first group are exclusively routed in planes of Z and Y, and (ii) each ribbon cable of the second group is routed only in planes of X and Z, a cable of the first group never cuts, nor crosses, a cable of the second group, and vice versa!

Electrical connection is preferably made between (i) exposed conductor ends bent 90° of the cables of both groups and (ii) conductive pads on the panels, which conductive pads lie along a straight line in an associated one of the planes of Z in which is present the associated panel, and which line is at a 45° diagonal both to the planes of X and the planes of Y.

Moreover, and also, electrical connection is also preferably made to electrically connectible points at pad regions which points are in a pattern having a 90° rotational symmetry to a like pattern of exposed conductors at the end of each multiconductor cable. Because of 90° rotational symmetry between connectible exposed conductor end points and substrate pad points, the connections of cables, duly bent, located in both second, X, planes and also in third, Y, planes is "straight on" in the Z planes. No bending nor any torsioning of any cable occurs despite the fact that cables of the same group extend in two different perpendicular planes, and cables of both groups extend in three different perpendicular planes.

Preferably the particular second plane of Z in which is routed the multiplicity of cables of a second group is located approximately midway between the two adjacent panels each of which is on a respective one of the planes of Z.

6. A Layered Switching Network

In still yet another of its aspects the present invention may be considered to be embodied in a layered switching network.

In this network switching chips reside in double-sided panels spaced-parallel in associated ones of parallel planes of Z.

Flat flexible printed circuit cables of a first group are routed between the panels in associated ones of two parallel planes of Z and one plane of Y. Flat flexible printed circuit cables of a second group are routed between the panels in associated one of three parallel planes of Z, and two planes of X.

Electrical connectors connect the cables of both groups to the switching chips upon the panels.

In the routing all the planes of X are everywhere perpendicular to all the planes of Y are everywhere perpendicular to all the planes of Z. Each ribbon cable of the first group is everywhere in its extension in a plane of Y routed between an associated pair of the planes of X; each ribbon cable of the second group is everywhere in its extension in a plane of X routed between an associated pair of the planes of Y. Accordingly, a ribbon cable of the first group never cuts, nor crosses, a ribbon cable of the second group, and vice versa.

In this layered switching network the electrical connectors preferably include exposed conductor ends of the flat flexible cables of both groups bent 90°, conductive pads on the panels—which conductive pads lie along a straight line in an associated one of the planes of Z in which is present the associated panel, and which line is at a 45° diagonal both to the planes of X and the planes of Y—and circuit traces upon the panel electrically connecting the pads to the switching chips.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 9, consisting of FIGS. 9a though 9c, shows in FIGS. 9a and 9b flat flexible multiconductor cables of the printed circuit or ribbon types located between the first and second panels. FIG. 9c shows the legend for the "X", "Y" and "Z" planes.

FIG. 13a shows the spring clip of the present invention in isolation; FIG. 13b shows the spring clip holding a flat flexible multiconductor cable to a tile.

DESCRIPTION OF THE PREFERRED EMBODIMENT

Figure 1A:
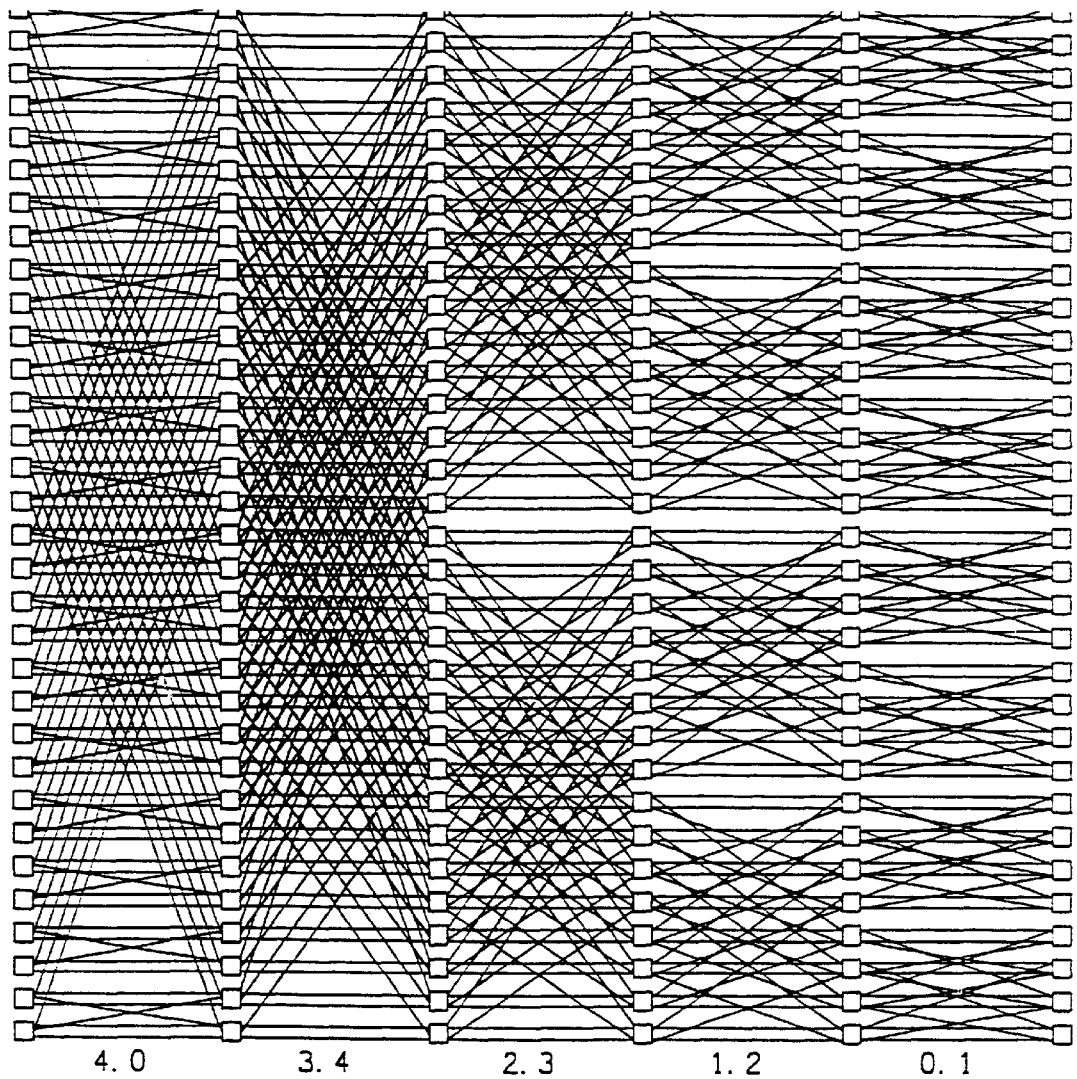
FIG. 1, consisting of FIGS. 1a through 1b, shows the topological transformations of a rotated folded 32-row layered switching network such as may be implemented in three dimensions by the (i) connection geometries, and (ii) connectors, of the present invention.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Background to, and Theory of, the Multi-Layer Switching Network Supported by the (1) Geometries and (2) Connectors of the Present Invention The multi-layer switching network supported by the present invention arose from (i) a confluence of activities at assignee of the invention Lockheed Martin Corporation, and (ii) the commercial availability of systems using the IEEE standard Scalable Computer Interconnect ("SCI") protocol for inter-processor communication. A switch topology and routing algorithm was used to implement a multi-stage interconnection network that mimics the ring behavior of SCI, but with (i) scalable bandwidth and (ii) very low latency. Although the topology of a multistage interconnection network is inherently scalable, the geometry of most switches, including those of the first-implemented multi-stage interconnection network, wasn't. Familiarity with multi-chip module technology in a related R&D project of the assignee of the present invention led to the invention of the scalable multi-layer switching network that is the subject of a related invention, and to the complimentary packaging that is the subject of the present invention.

The rest of this section describes 1 what the inventors think is beneficial in a scalable switch for parallel processing, much of which has already been demonstrated in a first-generation prototype.

1.1 Shared Memory

A cache-coherent, shared-memory model, that allows direct memory access among processing nodes is easier to program, and is inherently faster than message passing. However, there are distinguished computer scientists that will take issue with this point. Fortunately, the switch of the related and present inventions is indifferent to the discussion—it will support both message passing and shared memory use, even simultaneously. Current usage and perceptions need not limit migration to shared memory, if and when it becomes generally accepted.

Arguments for easier programming of shared-memory systems can get esoteric, but they include (i) the availability of more methods of task synchronization than just the passing of messages, and (ii) the ability to express parallel algorithms more abstractly, that is, with less concern about physical locations of programs and data. Message-passing architectures demand partitioning of the data as well as the algorithm. Knowing in which processor needed data resides and gathering it into the processor that needs it incurs software overhead. Shared-memory systems provide a global address space in which to access data directly, without needing to know which processor(s) produced the input data or which processor(s) will need the output data. Furthermore only the data actually needed is accessed rather than moving all the data that might be needed via messages. By eliminating the need to explicitly partition and move data, shared memory systems waste less bandwidth and permit algorithms whose structure is not data location dependent. System behavior issues such as deadlock, livelock and load balancing are less severe or nonexistent in shared-memory systems. Deadlock and livelock exposure can often be avoided by utilizing the appropriate synchronization primitives for the situation at hand, while load balancing can occur implicitly when the processors communicate via shared memory.

1.2 Low Latency and High Bandwidth

Low latency is more important than high bandwidth because processors often stall waiting for remote references. Lost latency is impossible to recover, while parallel and pipeline methods can preserve bandwidth. Recognizing this, the (multi-layer) switching network of the present invention is designed to have minimum latency. This is accomplished by using the "global addresses" of the Scalable Computer Interconnect ("SCI") protocol directly to make fast, local routing decisions. Local routing decisions are essential for scalability.

In contrast, those who strive for high bandwidth over long distances devise complex protocols, support very large packets and use look-up tables for routing decisions—making latency problematic. This is not to say that bandwidth is unimportant, rather that when low latency is the goal, high bandwidth comes free, but when high bandwidth is the goal, latency is sacrificed.

1.3 Commercial Off the Shelf (COTS) Technology

The IEEE standard SCI protocol enables the use of commercial-off-the-shelf (COTS) components with their low cost and their high potential for rapid technology improvement. The high-density packaging of the switching network of the present and related inventions facilitate deployment of powerful parallel processors in military and non-military platforms early next century.

1.4 Fault Tolerance and Graceful Degradation

Due to the large number of components in—by way of example of the type of systems in which the switching networks of the present and related inventions are most commonly used—30+ TeraFLOP/s systems, failed components will be relatively frequent, so fault tolerance and graceful degradation must allow computation despite failed components.

From the very beginning, development of the interconnection switching network of the related inventions, and the (i) geometry and (ii) connectors of the present invention, stressed error detection and reconfiguration. The switching network topology itself provides extra paths that reduce network contention when fully operational, but such as permit reconfiguration upon permanent faults with little or no reduction in connectivity. The physical structure, and packaging, promotes repair, and efficient effective repair. The error detection and graceful degradation mechanisms devised for hard-to-service systems such as satellites enhance availability in both military and commercial installations.

1.5 Hot Swap

Replacement of failed field replaceable units (FRU) while the system is running (hot swap) combined with graceful degradation and re-integration mechanisms can approach 100% system availability. Hot swap capability is totally compatible with the logical and physical switching network of the present and related inventions.

1.6 Goals and Objectives for the Switching Network

The switching network of the present and related invention is suitable for implementation at a bandwidth, and at a latency; supporting a 24+ TeraFLOP/s computer system. The entire system, and the geometry of its multi-layer switching network which is the subject of the present and related invention, is totally in accordance with the IEEE Scalable Computer Interconnect ("SCI") standard. The SCI-complaint switching network may be implemented as computer processor nodes communicating over the switching network using the SCI protocol.

Commercial availability of the switching network is intended. High volume production is intended. Since the most costly part of large switches—the switchpoint chips—are identical in both large, multi-layer, switching network switches, and in small scale, commercial, switches, substantial savings from economies of scale are expected.

1.7 Switching Network Performance

A performance goal of 0.33 to 0.5 GigaByte/s peak link rate per 1 GigaFLOP/s processor speed requires 2 to 3 GigaByte/s SCI links if 6 GigaFLOP/s processors are assumed. The second-generation switchpoint (for use in the switching network of the present invention) presently (circa 1998) under development at assignee of the invention Lockheed Martin Corporation is planned to have 500 MegaBytes/s peak link bandwidth, and to be available by 1999.

The processor counts and switch sizes to achieve 24 GigaFLOP/s with various assumptions of switchpoint generation and processor speed are shown in a related patent application. The multi-layer switching network packaging of the present invention nicely supports even powers of 2 number of ports, although partially populated switches may have nearly any number of ports.

1.8 Use of the SCI-Compliant Switching Network of the Present and Related Inventions with Commercial Products Currently, several vendors are offering, or plan to offer, systems using one or more SCI rings to provide inter-processor communication. By substituting the SCI-complaint multi-layer switching network of the present invention for existing ring(s) commercial vendors will both reduce latency and increase aggregate bandwidth of the inter-processor communication. This substitution requires little or no modification in application and system software developed to use SCI rings. However, maintenance portions of system software and switch control software running on the maintenance controller(s) dedicated to the switch still (circa 1998) need integration.

2. Technical Discussion of a Layered 3-D Switching Network in Accordance with the Present and Related Inventions The physical implementation in accordance with the present invention of the layered 3-D switching network of the related inventions is next upcoming in section 3 of this specification. Alas, it is first necessary to understand—in a manner dissimilar to most switching networks—exactly what switching network is being implemented because the layout of the network supports the geometry of its realization, and, in reverse, the geometry that can be realized (which geometry is the partial subject of the present invention) supports the layout of a switching network of a prescribed form.

The relationship between switching network layout and the possible geometries of the dense realization of a (multi-layer) switching network in multiple spaced-parallel switching panels (or modules) interconnected by flexible printed circuit cables was laboriously and extensively explored until the happy combination of the present and related inventions was realized.

Assignee of the present invention Lockheed Martin successfully developed and demonstrated a first-generation implementation of the network topology of the switching network, or switch, that is improved upon by the present and related inventions in July, 1996. That implementation contained GaAs switchpoints that operated at 500 MBytes/sec per port, and provided 16 input and 16 output SCI ports. That early switch was tested successfully with both GaAs and CMOS node interface chips, as well as with an experimental parallel fiber optics transmission system from Lawrence Livermore. In all of these activities the switch performed admirably, never contributing to the problems that invariably arise when first interconnecting disparate systems. This switching network attests to the maturity of the SCI standard protocol and electrical specifications (IEEE 1596/1992).

Assignee of the present invention Lockheed Martin is now, circa 1998, developing a second-generation CMOS switchpoint ASIC concurrently with a commercially viable packaging technology herein called "single-board-type" packaging. Single-board-type packaging uses conventional printed circuit boards with high density edge connectors for switches with up to 64 ports. As its name suggests, single-board-type packaging uses many copies of the same board design for switch fabric. Like the GaAs prototype, the present switchpoint operates at 500 MBytes/sec per port. Commercial partners of assignee of the present invention Lockheed Martin plan, circa 1998, to use these switches for both shared memory and message passing architectures.

To produce still faster switches, two additional steps are needed: a faster switchpoint, capable of at least 1 GigaByte/sec per port, and packaging technology suited to switches with thousands of ports. The present invention concerns the later technology.

The underlying interconnect topology is briefly introduced in section following section 2.1. Section 2.2 describes the Four-Square, large-switch technology that is planned to be developed support and how that technology will facilitate production of machines that meet future needs. The single-board-type switches are briefly described in section 2.3.

2.1 Layered Network Topology

The "Layered" network topology utilized by Assignee of the present invention Lockheed Martin in its switches consists of multiple shifted and overlaid copies of any of the well-known baseline-equivalent networks such as the reverse banyan network. Baseline-equivalent networks have been studied extensively, and are known to exhibit ideal scalability and latency characteristics, but suffer from high blocking properties and lack of fault tolerance. Multiple approaches have been proposed, and some implemented, addressing these issues.

The inventors have found that overlaying multiple, shifted copies of a classical network permits a dramatic reduction in contention simultaneously with the introduction of fault tolerance potential without affecting scalability and latency. Each new copy is formed by shifting the base network by one more stage, with the last stage becoming the first. Then it is overlaid, switchpoint by corresponding switchpoint, into the previous network. An example of a 32-row layered network switch, (or switching network) implemented by the present invention is shown in FIG. 1a.

Figure 1B:
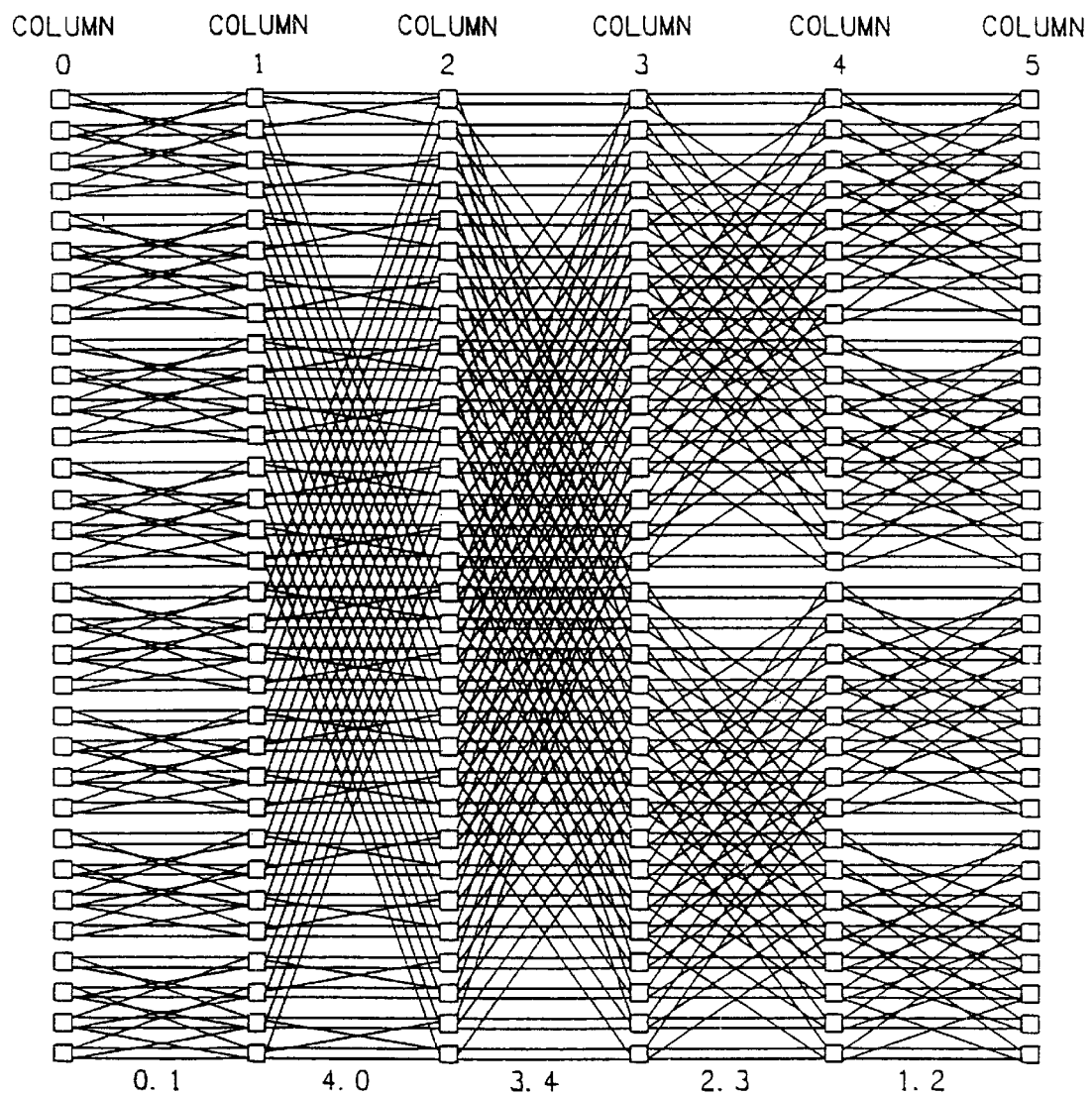

While it is possible to overlay shifted copies of the base networks log N times (a "fully"—Layered network), typically the switch properties affected by the second copy are enough improved that additional layers are not cost effective. The two-layer version was used in the first-generation switch, except that one of the straight paths that go between the same pairs of switchpoints has been eliminated to save pads, pins, and wires. Thus the switchpoint used has three input ports that route to three output ports. A layered network using 4×4 switchpoints having 64 rows and 128 SCI ringlets is depicted in FIG. 1b. The layered topology specifies wiring of switchpoints into arbitrarily-large switches having an integer power of two number of ports.

2.1.1 Hundreds of Nodes, Thousands of Processors

The switchpoint design of the present and related inventions can accommodate hundreds of nodes or thousands of processors because the network topology is scalable. FIG. 1a shows the wiring topology of a switch at its 128-port size. Scalability is claimed because the topology grows with the number of ports N at the same theoretical minimum rate as a banyan network (N log N), and its latency similarly grows as log N.

2.1.2 Low Latency

As previously discussed in section 1.2, the inventors believe that switch latency is the most important system parameter—even more important than processor speed. It matters little how fast a processor is-when it's stalled due to a network delay.

The switches (or, if preferred, switching networks) of the present and related inventions achieve low latency because a signal must traverse but few switchpoints which take only a few clock cycles each. Specifically, the second-generation switchpoint has a latency of at most seven eight-nanosecond clock cycles or 56 ns. A switch with P ports has $\log_2 P$ stages. Therefore, a 4096-port switch has a latency of 672 ns!

2.1.3 High Link Capacity and Bisection Bandwidth

The Scalable Computer Interconnect ("SCI") protocol was selected in part for its high link capacity. The parallel, differential, double-edged electrical signal portion of this protocol results in high raw bandwidth on each path. The logical portion of this protocol provides for effective bandwidth utilization as well as the early availability of packet destination address access essential to quick switchpoint routing. Link capacity at each port is constant for any size switch. The current switch's peak bisection bandwidth (using 3×3 switchpoints) is 150% of the aggregate peak port bandwidth. Bisection bandwidth can be further increased using already-developed layered network theory, should it be shown necessary for large switches. Switchpoint routing logic takes advantage of extra bisection bandwidth in the topology to reduce contention and provide fault tolerance.

Note that the bisection bandwidth must be a constant factor over the port bandwidth in any switch. A growth that is sub-linear with port count causes high contention in large switches, while a super-linear growth undermines scalability.

As explained in section 2. above, the second-generation switchpoint has peak link bandwidth of 500 MBytes/s. A 1 GigaByte/sec switchpoint is expected with semiconductor process improvements.

2.1.4 Self-Routing Switchpoints

Each switchpoint chooses its routing independently, using only local information, for speed and robustness. Routing is decided by comparing the address of a packet with the switchpoint's position. in the network. Re-circulated packets that did not reach their destination ringlet their first time through the network are given priority for port selection. Similarly, packets that cannot possibly reach their destination ringlet on this pass through the network (due to contention, faults or both) get last chance for port selection. These routing policies ensure that all packets are eventually routed (forward progress is guaranteed), and hopeless packets don't interfere with those that still can reach their destination this trip through the network. These policies minimize the effects of contention within the switch, and in behavioral simulations show excellent behavior in heavy loading and hot spot conditions.

2.1.5 Layered Network Topology Reduces Contention

The layered topology of switchpoint wiring (i.e., the subject of the related inventions) and the logical (subject of related inventions) and physical (subject of the present invention) routing of switchpoints themselves were invented specifically to reduce network contention. At each stage, two different diagonal paths are available in addition to a straight path. The multiple diagonal paths provide many ways for a packet to reach its destination. Under high traffic these diagonal paths allow packets to reach their destinations despite the presence of other packets.

2.2 Four-Square Packaging Technology

The large switches of the present and related inventions have the bandwidth, latency, and shared memory operations needed by 24+ TeraFLOP/s systems. This is in part due to the new packaging scheme for large switches—the exact subject of the present invention—which is called "Four-Square." Four-Square packaging packs switchpoints tightly and connects them with short, straight flexible printed circuits (flex). Most importantly, Four-Square packaging scales well to whatever size switch is needed. Arbitrarily-large switches can be constructed from a single type of multi-chip module (MCM or tile) connected by flexible, printed circuits (flex) whose maximum length scales proportionally with the square root of the number of ports.

2.2.1 Tiles and Flexible Printed Circuit Wiring

Switches of the present invention use (i) advanced multichip modules ("MCMs") and (ii) flat flexible multiconductor cables of the printed circuit or ribbon types to achieve high density interconnection. This MCM technology permits the construction of tiles in the Four-Square packaging approach.

Figure 2:
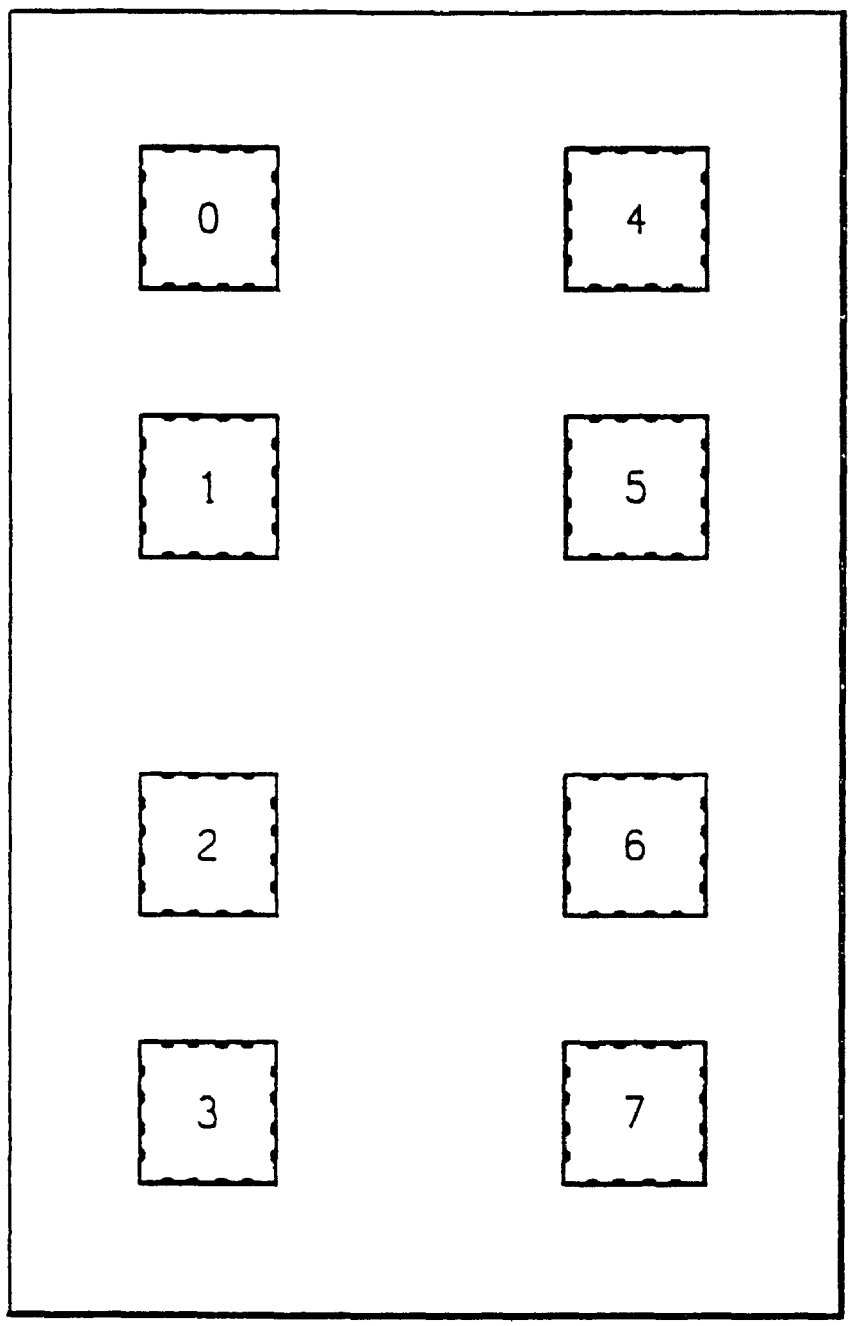
FIG. 2 shows dual-switchpoint dice (chips) embedded in a tile, with corresponding row numbers.
Figure 3:
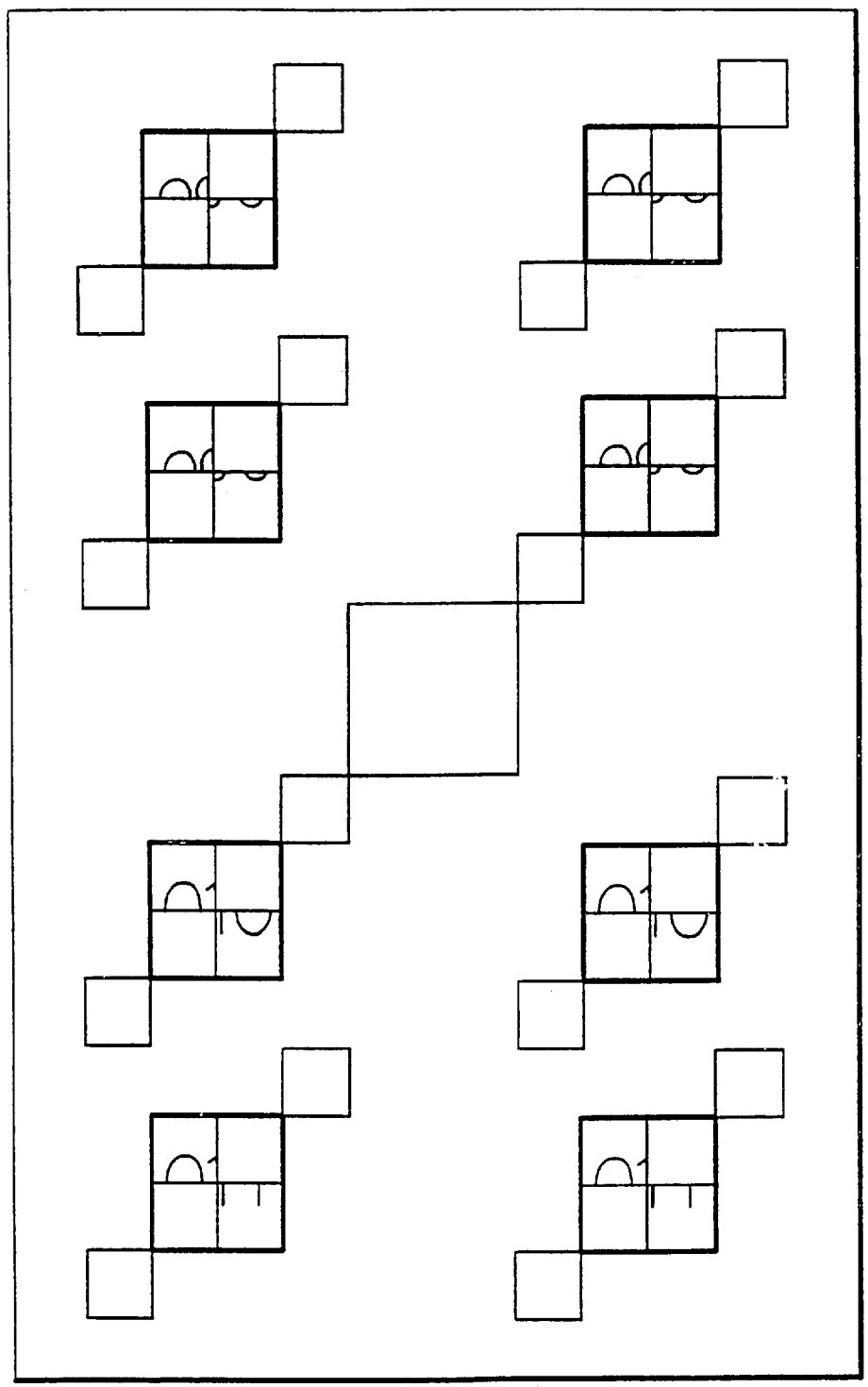
FIG. 3 shows the geometry, in accordance with the present invention, of the connections made upon the front of a tile.

One property of these tiles is the ability to make connections on the surface of both sides, FIG. 2 depicts a tile containing 16 dual-switchpoints (also known as switchpoint chips, or simply chips). The small squares in FIG. 3 are locations where flexible multiconductor cables are attached by the small spring clips of the present invention (later shown in FIG. 13) to maintain electrical connection between the contacts on the surface of the tile and the cable that connects to another tile. The large square in the middle has connections for straight paths. The pattern of contacts on one side is the mirror image of the other side.

2.2.2 Four-Square Tiles

All switchpoints (chips) are embedded in identical tiles that are interconnected with flat flexible-multiconductor cable of the printed circuit or ribbon types. Each tile contains eight dual-switchpoint chips.

Tiles start from a thermally conductive substrate in which cavities are milled so that embedded dice's surfaces are level with the substrate. Vias are drilled through the substrate so connections can be made on both sides of the tile. Layers of wiring are deposited over the dice and substrate with a lithographic process. Connections to pads on dice are made directly without need for wire bonding. The resulting tiles are compact and sturdy.

2.2.3 Panels

Figure 7:
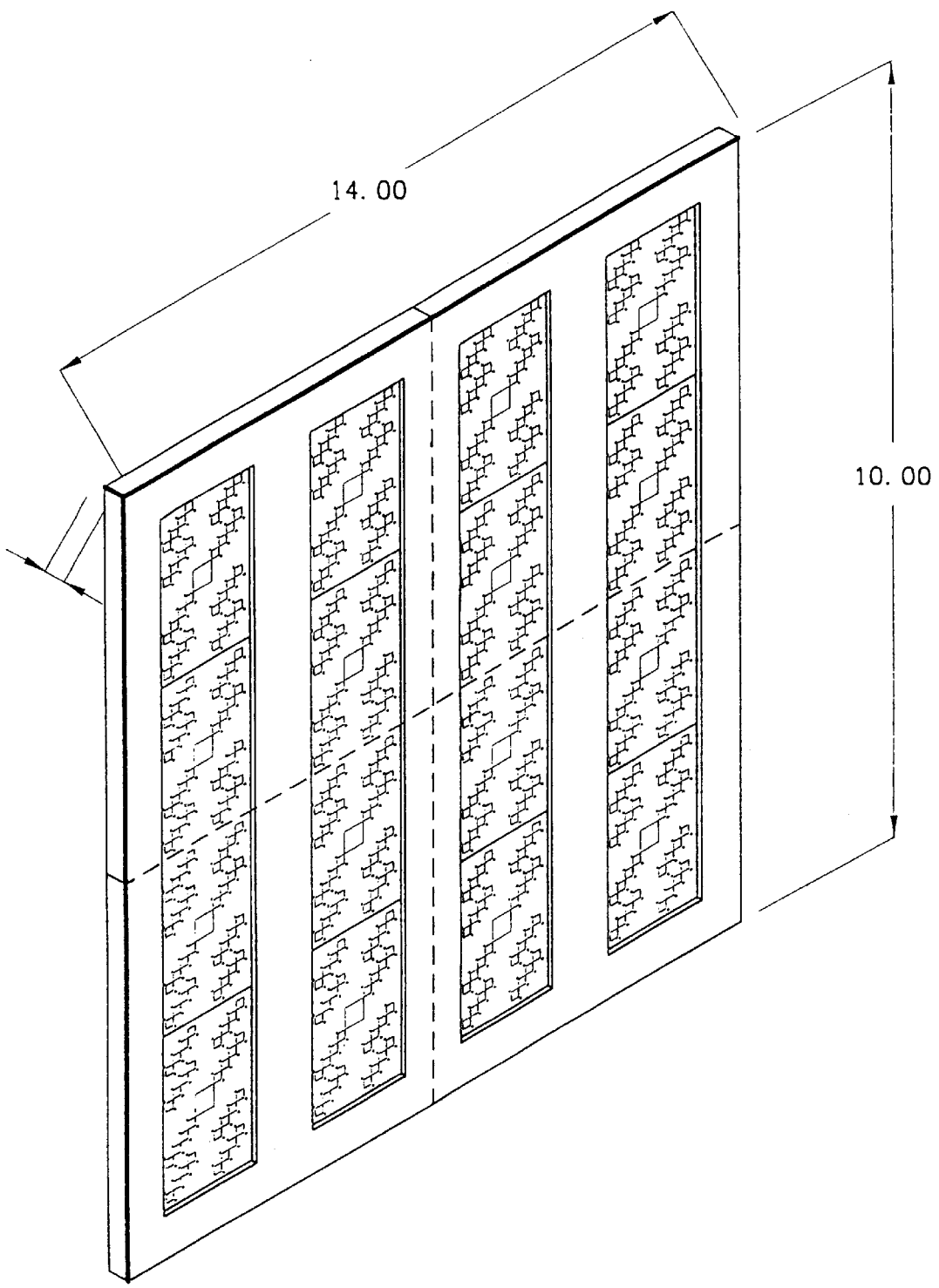
FIG. 7 shows a 16-tile panel used in a multi-stage switching network.

Tiles are assembled into square panels. FIG. 7 shows a panel holding 16 tiles that would be used in a 256-port switch. Tiles are latched firmly in panels so that the heat generated within may be transferred to coolant flowing through the panels (path not shown). Electrical connections for power and ground supplied by the panels are not shown. Panels are separated a few inches so that interior tiles can be replaced while the switch is operating for hot swap repair.

2.2.4 Four-Square Flat Flexible Multiconductor Cable

Connections between tiles, made from relatively inexpensive flat flexible multiconductor cable, carry low-voltage differential signals (LVDS) between base modules. "Rigid" conductor ends to the flexible cables are pressed against tiles by clips to make electrical contact. Except for the "top" layer, connections always run from the back of a tile in one panel to the front of a tile in the next panel and always run straight up-and-down or side-to-side. The top layer runs between contacts on the panel furthest from the processors. Packets burrow through switchpoints in tiles away from the processors until the top layer; where they start to burrow back. This avoids the problem of physically connecting to opposite sides of the switch; outgoing and incoming channels are adjacent for simple, short connections to processors using the switch.

Advantages of making connections with flexible printed circuit wiring include: impedance matching, multiple layers of conductors, foil shielding to reduce cross-talk connectorless contact with tiles, low unit cost, small size and flexibility so failed tiles and/or flexible printed circuit wiring can be replaced without disassembly.

2.2.5 Scaling

Figure 8:
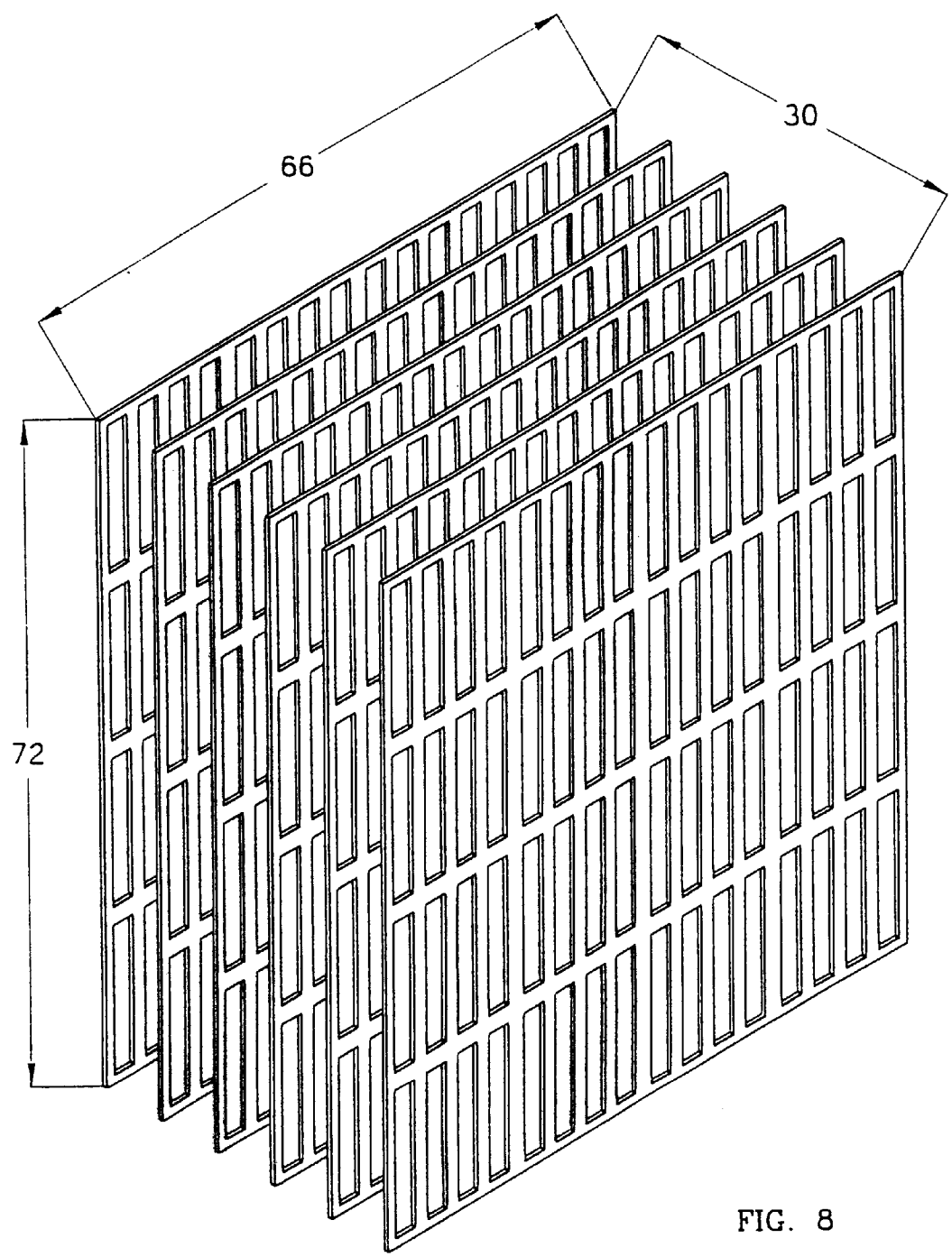
FIG. 8 shows a 4096-port switch using 6 big panels each of which holds 256 tiles; each big panels being made by assembling 16 of the smaller panels shown in FIG. 7.

Four-Square packaging scales by combining four square switches into a larger square switch with four times the capacity, permitting both unbounded scaling and expansion of already-installed switches. Combining four panels as shown in FIG. 7 into a large panel about 32 inches on a side makes panels for a 1024-port switch. Panels for a 4096-port switch nominally use 16,256-port panels that is about 64 inches on a side. A 4096-port switch containing six of these big panels is shown in FIG. 8. The switch is about 30 inches deep held in a rack with removable, clear, access panels. It contains 1536 tiles, 24576 switchpoints, and 50688 flexible printed circuit wiring connections total. The longest flexible printed circuit wiring connection for a 4096-port switch is only 38 inches (half the width plus panel spacing). Larger switches are possible, if desired. Each quadrupling of the number of ports adds another panel (four times larger) and roughly doubles the length of the longest flex.

2.2.6 Partial Population

An arbitrary-size switch can be built by partially populating the next larger size Four-Square switch.

2.2.7 Field Replaceable Units

The flexible printed circuit wiring connections allow expansion like an accordion for access to any field replaceable unit (FRU) for hot swapping. Tiles and flexible printed circuit wiring are FRUs. The panel frames bold the tiles and provide power and cooling. The panel frames are not be field replaceable without powering-down the switch.

2.2.8 Four-Square Geometry

Layered networks have nice topological properties for routing, but projecting the topology of these networks into a geometry that scales using existing fabrication techniques has been a challenging exercise leading to the present and related inventions. The "single-board-type" geometry allowed fabrication and assembly of a single kind of printed circuit board that could be used repeatedly to build switches of various sizes. Unfortunately, local routing between switchpoints on the same board comes at the expense of longer and jumbled wiring between boards. This limits the size of the switches that can be constructed with conventional printed circuit cards plugged into a passive backplane with edge connectors. Assignee of the present invention Lockheed Martin expects to use such conventional technology in its air-cooled commercial switches with 8 to 64 SCI ringlets.

In contrast, the Four-Square geometry of the present and related inventions uses features available in the latest multi-chip module technology. Development of processor modules to fly in Joint Strike Fighter (JSF) cross-pollinated the development of this Four-Square geometry development.

The emerging technology employed towards the integrated core processor on JSF made new geometries possible. Principal features of the tile technology of assignee of the invention Lockheed Martin that permit use of Four-Square geometry are: permitted dense dice packing; ready conduction of heat from dice to module edges; direct, high-density interconnection (HDI) made directly to bonding pads on dice (a particular subject of the present invention); and most importantly, routing from each die to connections on both faces of the tile.

Another tile technology feature permits HDI connections between pre-made tiles. Four-Square geometry originally envisioned sheets of HDI over planes of identical tiles. Unfortunately, the lithographic processes that draw the tiny lines for HDI can expose only a limited area while retaining resolution. Although sheets of HDI may be supplanted by flexible cable for upwards scalability, military and satellite systems may use HDI sheets to implement Four-Square geometry when weight and volume are paramount and hot swap capability is useless.

Those attempting to understand the following explanation of Four-Square geometry may find it helpful to imagine two-dimensional sheets of HDI connecting switchpoints in tiles, later replacing the sheets of HDI (mentally) with three-dimensional flat flexible multiconductor printed circuit cable.

2.2.8.1 Layered Network Topology

In Layered networks, a switch can route a signal to another switch in the next stage that has the same switch number except for a single binary digit. A "request" (packet) contains a binary number identifying the desired response port. The switch compares the request's destination with bits in its own switch number, and if the bits compared are the same, the request is routed to a straight interconnection path between the switchpoints. Otherwise, the request is routed to another switch through one of the "diagonal" connecting paths. This reduces the Hamming distance (the number of bits that differ) between a packet's destination address and the row number of the switchpoint it currently occupies by one. At the end of the network, should the request reach the switching output stage and the switch number exactly match the request, the Hamming distance will be zero.

The connections between the output terminals of one column of switches and the input terminals of the next column of switches are interconnected in accordance with selected row address routing bits. The algorithm for implementing an embodiment of a Layered network depends upon the input and output terminals that are associated with each of the switches and the numbered switches in a selected algorithm base.

The particular Layered network of FIG. 1*a* is a two-planed Layered network and has thirty-two rows and two planes. This means that the interconnection wires throughout the network from the output terminals of the switches of column 0 to the input terminals of the switches of column 5 have two straight paths and two diagonal paths for each of the switches of the network. (Note: the switchpoints under development have one straight and two crossed paths.)

2.2.8.2 Rotate Columns

FIG. 1*a* shows that the longest wires in the layered network embodiment occur between the switches of columns 0 and 1 and between those of columns 1 and 2. A preferred, but optional, first step in implementing the present invention in networks, such as the one in FIG. 1*a* in which the longest interconnecting wires are not found in the middle of the network, is to "rotate" the columns of the network, as illustrated in FIG. 1*b*, so that the longest connections are relocated in the middle of the network. FIG. 1*b* shows how this is accomplished for the network of FIG. 1*a*.

After rotation it is seen that the interconnection pattern that existed in FIG. 1*a* between columns 4 and 5 now appears between those of columns 0 and 1 in FIG. 1*b*. The interconnection between the outputs of the switches of column 1 and the inputs of the switches of column 2 is then identical to the interconnection pattern between the column of switches 0 of the column of switches 1 in. FIG. 1*a*. Thus, all of the interconnection patterns are moved to the right so that the interconnection pattern of FIG. 1*b* between the switches of columns 1 and 2 with the longest interconnection paths is placed between the switches of columns 2 and 3 in the middle of the network of FIG. 1*b*.

2.2.8.3 Connections Between Switchpoints

Which row address routing bits are used to determine the wiring pattern between the switches of the Layered network of FIG. 1*b* are shown below the wires and between the columns of the switches, for example, between columns 1 and 2 row routing adders to use the path to the switchpoint in the next column whose row number differs by the bit indicated by the second digit. This is called "last chance" routing, because if a packet needs to take a diagonal path to toggle a bit, this is the last chance to do it. The order the bits are handled are irrelevant so long as they are handled in successive columns. Four-Square takes advantage of this freedom to facilitate scaling. When four smaller networks are combined into a larger one, the extra columns of switches and wiring are effectively inserted into the middle of the network so that the two new address bits (most significant) are routed in successive stages.

In the network of FIG. 1*b*, each switch has four outputs and four inputs. But the current implementation of switchpoints neglects one of the straight paths to conserve package and board pins. The single, straight path is connected between switches in adjacent columns. The row routing address specifies diagonal path interconnects. The diagonal paths are determined by complementing a particular bit in the row number of the originating switch to find the row number of the destination switch.

For example, wiring the diagonal path from the switch in row 0, column 0 (upper left-hand switch in FIG. 1*b*) to the switch in row 2, column 1 is determined by complementing bit 1 of the originating switches row. (Binary, non-negative integers number their bits from right to left starting with zero.) $00000_2 =>$ complement bit $1 => 00010_2$ Wiring the other diagonal path is determined by complementing bit 0 to connect to the switch in row 1, column 1. Similarly, the switch in row 7, column 3 is connected to the switch in row 7 (single-straight path), row 3 (bit 2 complemented), and row 15 (bit 3 complemented). Switches are numbered in hexadecimal for ease of conversion to binary.

2.2.8.4 Fold

The interconnection pattern of FIG. 1*b* should now be conceptually "folded" at the middle of the network along the dotted line between the columns of switches 2 and 3. Conceptually performing this operation makes two overlapping planes of switches. The switches of columns 0–2 may be thought of as forming an upper plane and those of columns 3–5 as forming a lower plane, and when finally fabricated interconnections will be made around switches in overlapping columns after folding. Switches to the left of the dotted line before folding are then representative of switches on the upper layer that send requests "away" from the processors connected to -the left-hand, input side; switches to the right of the dotted fold line then represent switches on the lower level that send requests "back" towards processors connected to the right-hand, output side of the structure. In other words, all of the switches of columns 0–2 to the left of the dotted line will lie in one layer directly over the switches of columns 3–5 to the right of the dotted line. Folding does two things: it solves the end-around problem, and it puts the longest wires on the new "top." The end-around problem is endemic to multistage interconnection networks. Usually a processor needs to connect to both sides of the network, as is certainly the case with emulation of the unidirectional ring protocol SCI uses. If the processors are plugged into one side of the network, then 4096 channels emerging from the opposite side need to loop the end around in a most inelegant manner. In Four-Square geometry, packets traverse half the network "away" from the processors, and the other half "back." This is why two columns of switchpoints reside on the same tile and why four different routing grids are needed for flexible printed circuit wiring connections between panels. Routing grids can route North/South, (N/S), or East/West (E/W) wires between switchpoints whose row numbers differ by a single bit, independently of whatever direction a bit is wired in the other routing grids. Two columns of wiring route two address bits each, using four routing grids.

2.2.8.5 Squaring

After folding, the switchpoints are laid out in a square such that every switchpoint whose row number differs by a single bit lie straight North, South, East, or West. The eight dual-switchpoints on each tile are arranged in a 2×4 rectangle so that given numbers as shown in FIG. 2, they obey this property.

FIG. 3 shows contacts on the surface of the tile to which flexible printed circuit wiring connections are attached with the spring clips of the present invention (shown in FIG. 13). Mote in FIG. 3 that only those pads in eight-groups of four—each of which groups extends from the lower left to the upper right—are populated with chips. The larger areas on the substrate to which connection is made are numbered top-to-bottom left-to-right as 000, 001, 010, 011, 100, 101, 110, and 111. Parts of these identification numerals are obscured by the chips. FIG. 9 shows the wiring between tiles in the first and second panels. All the flat flexible cables between the first and second panels (no matter how large a network is constructed) connect between tiles that are directly across from each other. After folding, bits 1,0 away and 2,1 back are wired between the first two panels. Wiring goes to contacts labeled a0,a1 and b0,b1 for paths going away and back respectively. Therefore some flexible printed circuit cables in the "X planes" connect a0 contacts between switchpoints whose row numbers differ by just bit 1. Other flexible printed circuit cables in the "X planes" connect a1 contacts between switchpoints whose row numbers differ by bit 0. Flexible printed circuit cables in the "Y planes" connect b0 contacts for bit 2. Finally, yet still other flexible printed circuit cables in the "X planes" connect b1 contacts. Which bits are routed at which stage of the network determines the connections made by each multiconductor cable.

Figure 4:
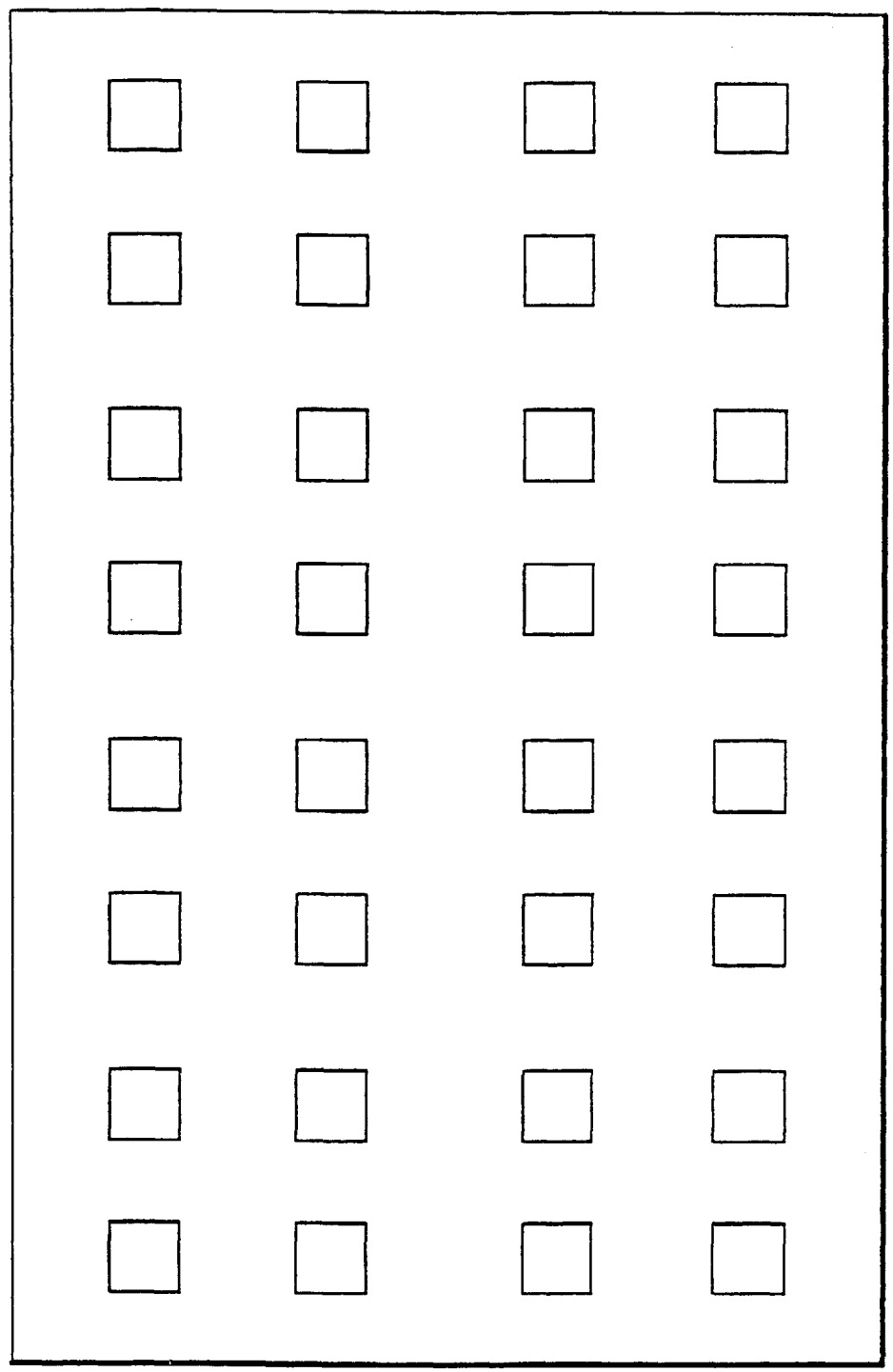
FIG. 4 shows the switchpoint row addresses for four tiles of the thirty-two row switching network of FIG. 1.
Figure 5:
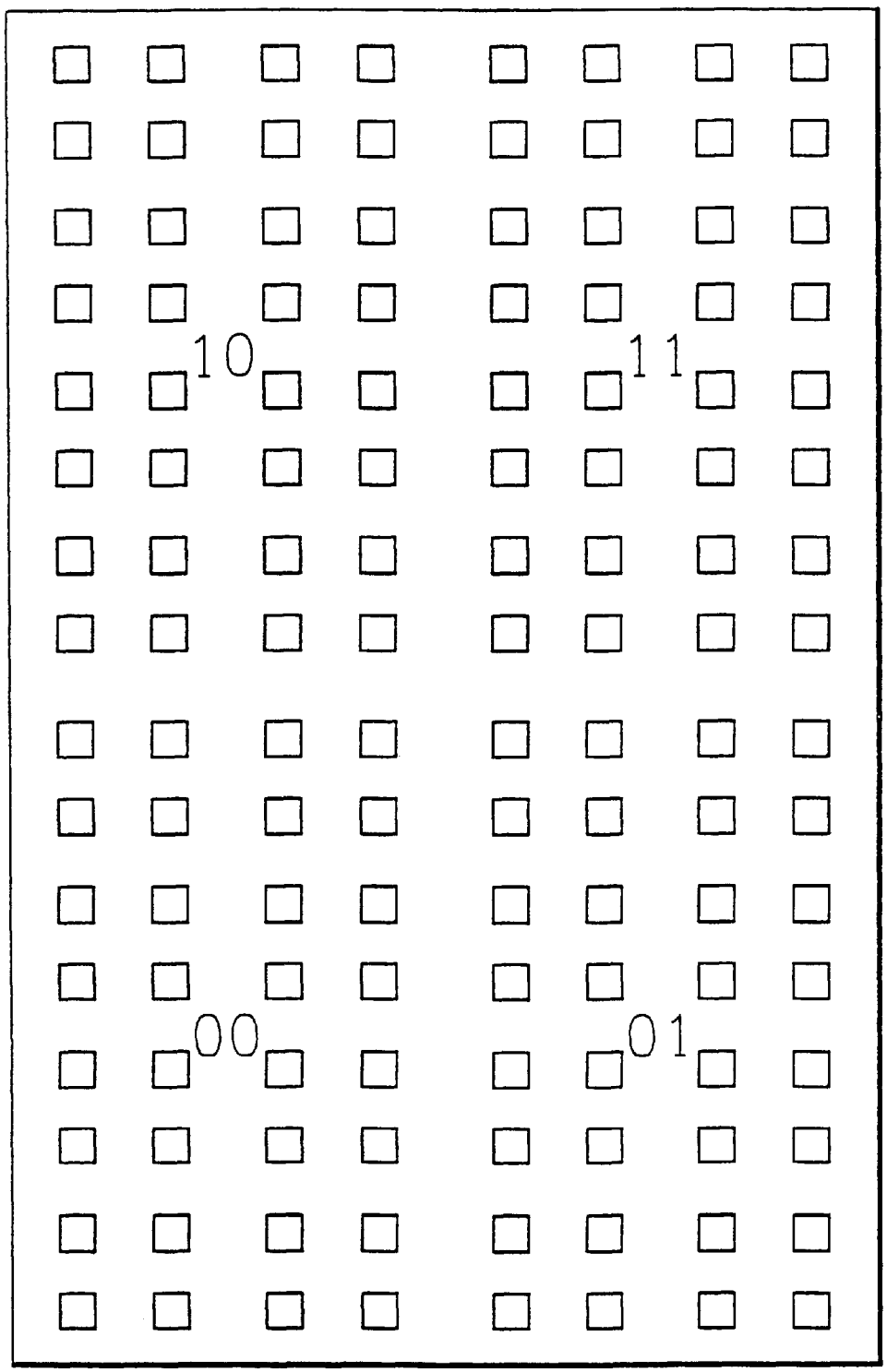
FIG. 5 shows the numbering of switchpoint tiles within 16-tile panels.

Each time four smaller networks are combined into a larger network, there will be four times as many rows which require two additional bits to number. FIG. 4 shows the switchpoint row addresses for four tiles, 32-rows. Expanding by four again gives 128-rows, and two more bits for row numbers, as shown in FIG. 5. In other words, FIG. 5 shows switchpoint numbering in 16-tile panels. Switch number 29 ($0011101_2$) is highlighted in FIG. 5 by being cross-hatched. Tiles are shown without the panel frame that holds them.

2.2.8.6 Panels

FIG. 7 shows a 16-tile panel. The panel frame is planned to be plumbed for coolant to extract heat from the edges of the tiles. Panels also supply power and ground to the tiles. JTAG maintenance channels may also be placed on panel frames. Larger panels would be made from squares of smaller panels.

2.2.8.7 Putting It All Together

Figure 10:
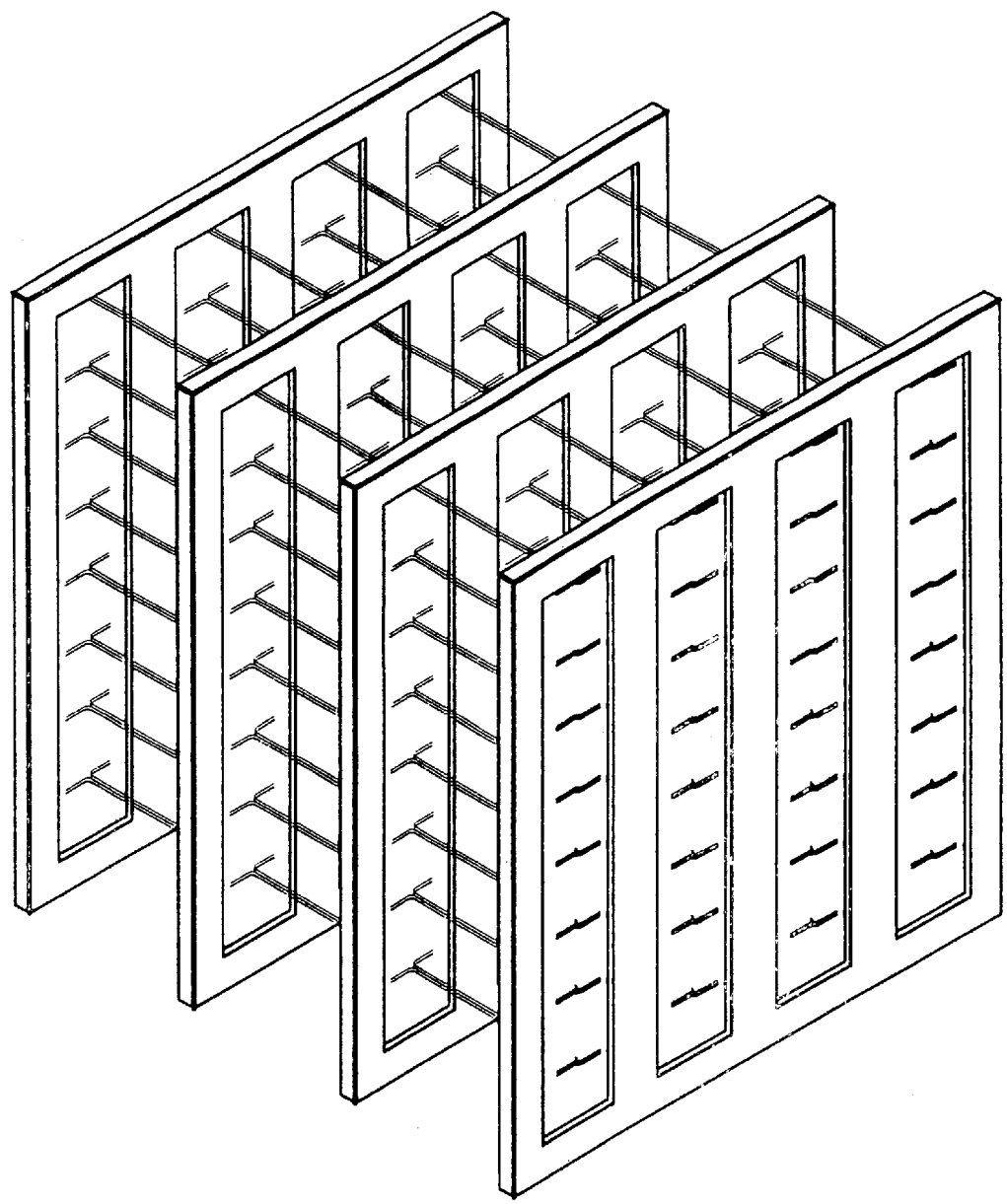
FIG. 10 shows a 128-row, 256-ringlet switch made from four panels each containing 16 tiles; as is the preferred configuration for a large multi-stage switching network.

FIG. 10 shows a 128-row, 256-ringlet switch made from four panels, each containing 16 tiles. Larger panels can be made by successively combining four smaller square panels.

The cables connecting the panels will be understood to have width, which width may be observed in FIG. 10 upon close inspection. Note how the "flats" of the connecting cables are aligned in co-parallel vertical planes. The actual connection of larger switches, as will be developed in further figures, is more complex, with cables in multiple orthogonal planes. However, the general concept of "correct order" is maintained.

3. The Physical Implementation in Accordance with the Present Invention of a Layered 3-D Switching Network of the Related Inventions The topology of a rotated folded 32-row layered switching network such as may be implemented in three dimensions by the (i) connection geometries, and by the (ii) connectors, of the present invention is shown in FIG. 1.

Dual-switchpoint dice (chips) embedded in a tile, with corresponding row numbers, are shown in FIG. 2.

The geometry, in accordance with the present invention, of the connections made upon the front of a tile is shown in FIG. 3.

The switchpoint row addresses for four tiles of the thirty-two row switching network of FIG. 1 are shown in FIG. 4.

The numbering of switchpoint tiles within 16-tile panels is shown in FIG. 5.

Figure 6:
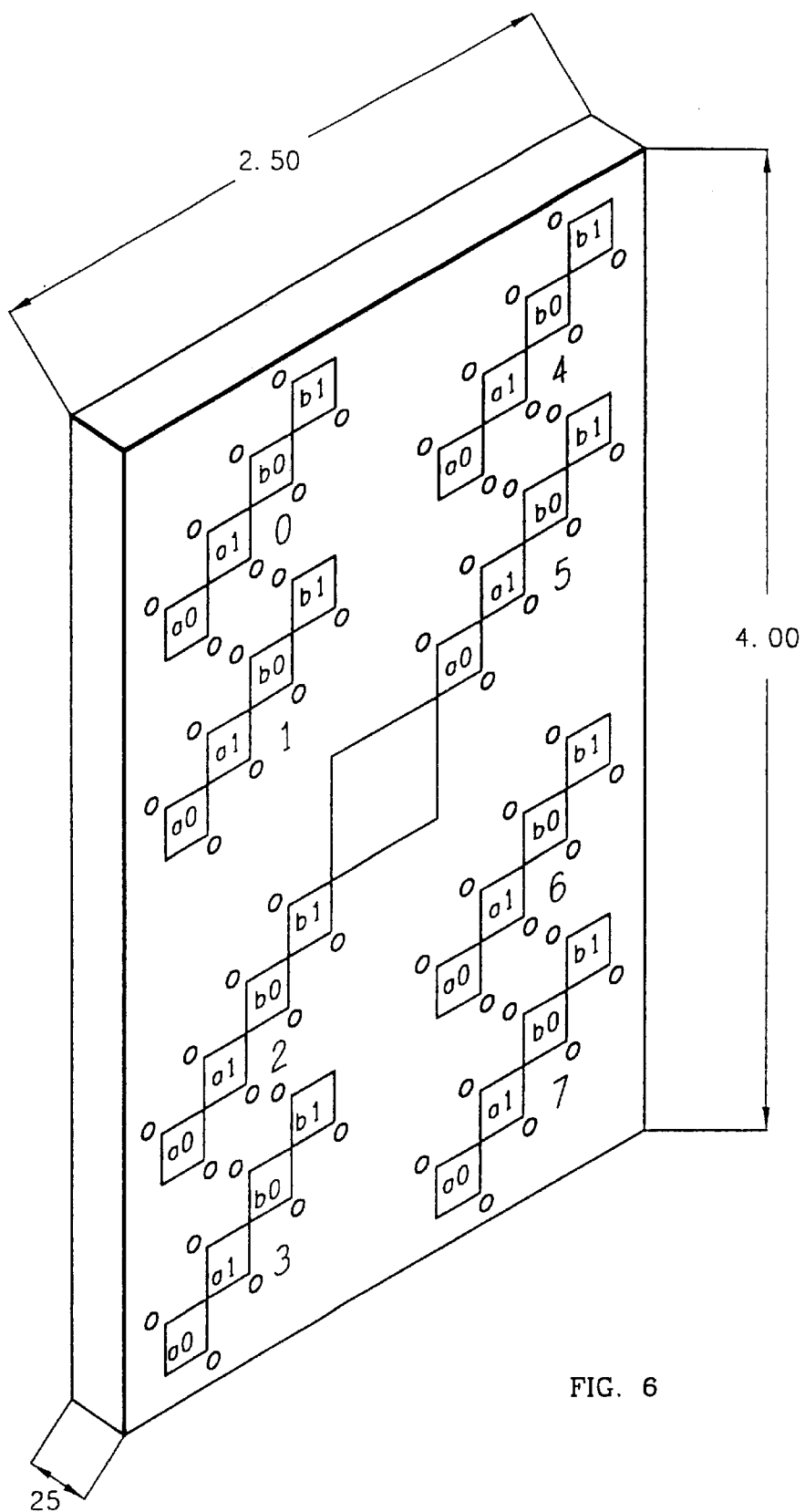
FIG. 6 is another view, now in perspective as will be carried forward into further figures, of a tile previously seen in FIG. 2.

Another view, now in perspective as will be carried forward into further figures, of the dual-switchpoint dice (chips) embedded in a tile previously seen in FIG. 2. is shown in FIG. 6. The particular multi-chip module, or tile, shown encloses eight dual-switchpoint dice. Each die connects to four diagonally-arranged pads on both sides of the tile. These pads are diagonally offset to allow flexible printed circuit wiring connections without conflict. Straight paths between dice on adjacent panels are connected through the large pad in the middle. As shown on the FIG. 6, a typical size for the tile is two and one-half inches by four inches (2½"×4").

A 16-tile panel is shown in FIG. 7. Power, ground and cooling are provided by the panel frame enclosing the tiles. Four 16-tile panels are used in a 256-ringlet switch. The 16-tile panels are used in a multi-stage switching network. Considering the two and one-half inches by four inches (2"×4") typical size for the tile shown in FIG. 6, the typical size of the panel is ten inches by fourteen inches (10"×14"), as illustrated.

A 4096-port switch, using 6 big panels each of which holds 256 tiles, is shown in FIG. 8. Each of the big panels can be made by assembling 16 of the smaller panels shown in FIG. 7. The same components for this multi-stage switching network can be used to build switches as large as necessary. The typical size of the entire switch is thus thirty inches by sixty-six inches (by seventy-two inches (30"×60"×72"), or six feet by five and one half feet by two and one-half feet (6'×5.5'×2.5'), as illustrated. This switch is sometimes colloquially referred to as the "big switch".

Flat, or planar, flexible multiconductor printed circuit cables of the printed circuit or ribbon types are shown between the first and second panels in FIG. 9, consisting of FIGS. 9a and 9b. The pattern of the flexible multiconductor cable without the tiles to which it connects to is shown in FIG. 9a. The same pattern with the connecting tiles is shown in FIG. 9b.

A legend for "X", "Y" and "Z" planes as such terms are used in this specification is shown in FIG. 9c for comparison with FIGS. 9a and 9b and with following figures. The two "Z" planes, and single "X" and single "Y" plane illustrated in the legend are, or course, only exemplary of large families of parallel "planes of X", "planes of Y" and "planes of Z".

FIG. 9, and particularly FIG. 9b, is—due to the limitations of drafting a three-dimensional view of each of the abundant flexible printed circuit cables appearing in, for example, FIG. 12—as close to a showing of the effect of the present invention as appears is anywhere within the Figures. FIG. 9b deserves careful study, if only to recognize certain phenomena in the interconnection (via flat flexible cable) derived by the present invention. For example, it should be observed that the great extent of each of the flat flexible printed circuit cables between the panels is substantially in a one of two planes that are orthogonal to each other. Moreover, the cables in these planes do not jam into each other. They may sometimes "slide by" one another, as may be observed by careful inspection of the most dense regions of FIG. 9b, but there is never a requirement that any routing should deviate (in the region between the panels) from a straight line in order to escape conflict with any other routing.

The cables of the first group, shown in FIG. 9a, that are routed entirely in the planes of Z and the planes of Y correspond to the signal routings that are shown horizontal in FIGS. 1a–1b and like figures of the preferred multi-stage switching network in accordance with the present invention. Meanwhile, the cables of the second group, shown in FIG. 9b, that are routed entirely in the planes of X and the planes of Z, correspond to the signal routings that are shown diagonal in FIGS. 1a–1b and like figures of the preferred multi-stage switching network in accordance with the present invention.

This, in a nutshell, is what the present invention is all about. A particular logical routing algorithm, and scheme of mapping such onto the physical elements of a physical switch turns out, in the final analysis, to support a physical interconnection (via flat flexible cable) which is, if possibly neither elegant nor beautiful to the eyes of some beholders (as it is to the eyes of other beholders), at least susceptible of practical implementation.

A 128-row, 256-ringlet switch made from four panels each containing 16 tiles is shown in simplified form FIG. 10. This is the preferred configuration for a large multi-stage switching network. The enclosing rack, power supplies, cooling and connections from the front panel to SCI nodes are not shown. The illustrated switch is simplified in that it is impossible to show the full sophistication of the cable connection between the panels in a line drawing. Basically, the cables between the panels of FIG. 10 look like the cables of FIG. 9b not merely replicated, but raised to some power. It may be useful for the reader to know that the drawing of FIG. 10 has previously been computer rendered at large scale in color by the Assignee of the invention Lockheed Martin. Even when so rendered, the cable routing is very complex, and very dense. It is also very remarkable in that, although the volume between the panels seems to commence to fill with cable, not one single cable seems "out of place", nor to bend or distort to avoid conflict with any other cable. Although perhaps only hinted at in the line drawing of FIG. 10, this is yet again what the present invention is all about. The present invention must be realized not merely to be some arbitrary—albeit large and fast—switch and routing scheme for electrical signals, but a way of organizing a non-blocking fully-cross-interconnected multi-layer switching network so that, in the end analysis, the physical switch an actually be built and assembled and, if necessary, partially disassembled and repaired and re-assembled, with some degree of success, reliability, and, ultimately, order and grace.

Figure 11:
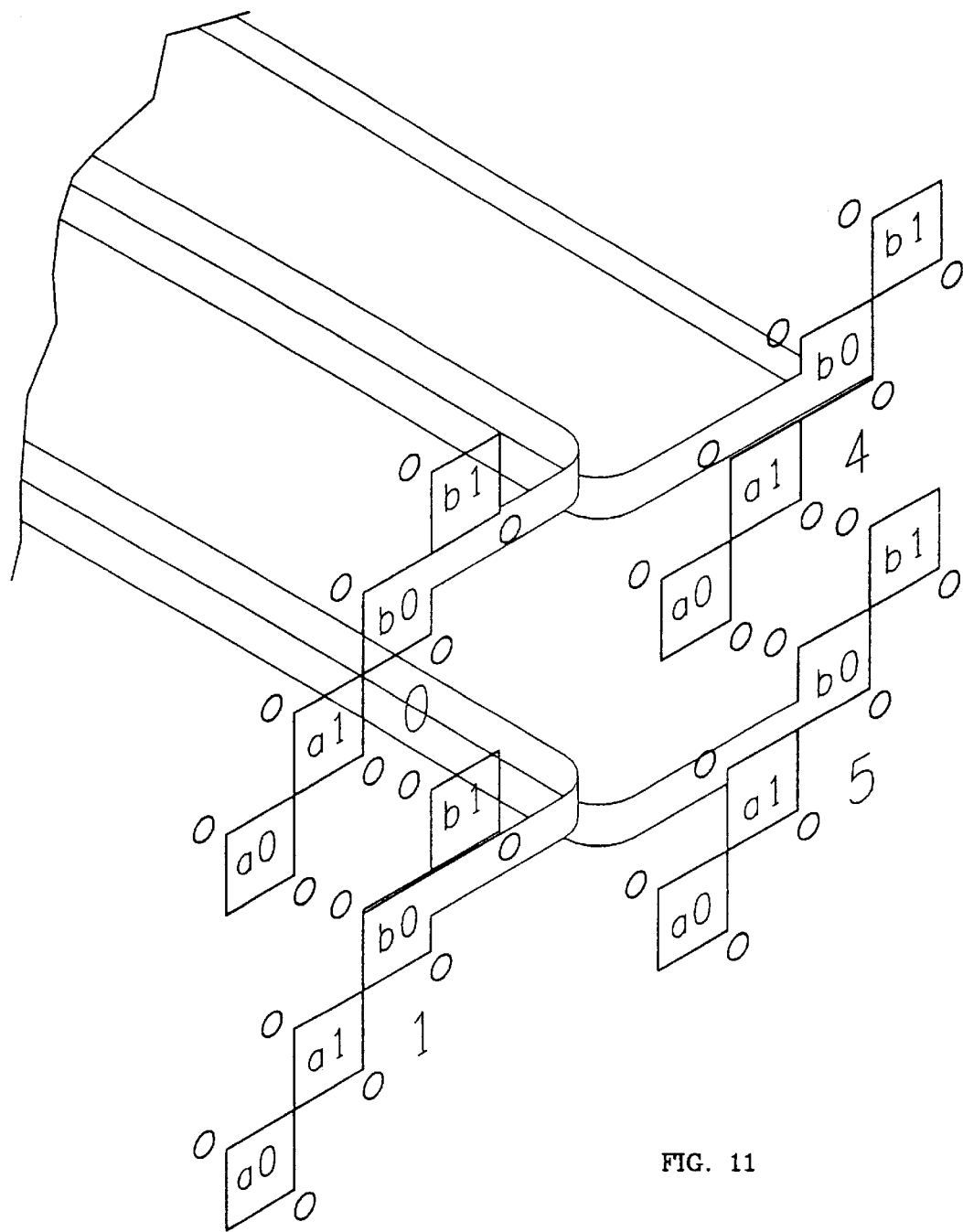
FIG. 11 shows the manner of flexible flat multiconductor, ribbon, cable connections to a tile.

The manner of flat flexible multiconductor cable connections to a tile is illustrated in detail in FIG. 11. Connections to the back of a tile in the first panel are shown through the tile. The pads and connections am on the back side of the tile. Each dual-switchpoint die connects to four diagonally arranged pad on each side of the tile. The end of the flexible printed circuit wiring connection fill the whole square pad, but the middle is only 100 mils wide so crossing flexible printed circuit wiring connections can pass. The small circles are anchor points for clips holding the ends of the spring clips connectors firmly against the tile.

Figure 12A:
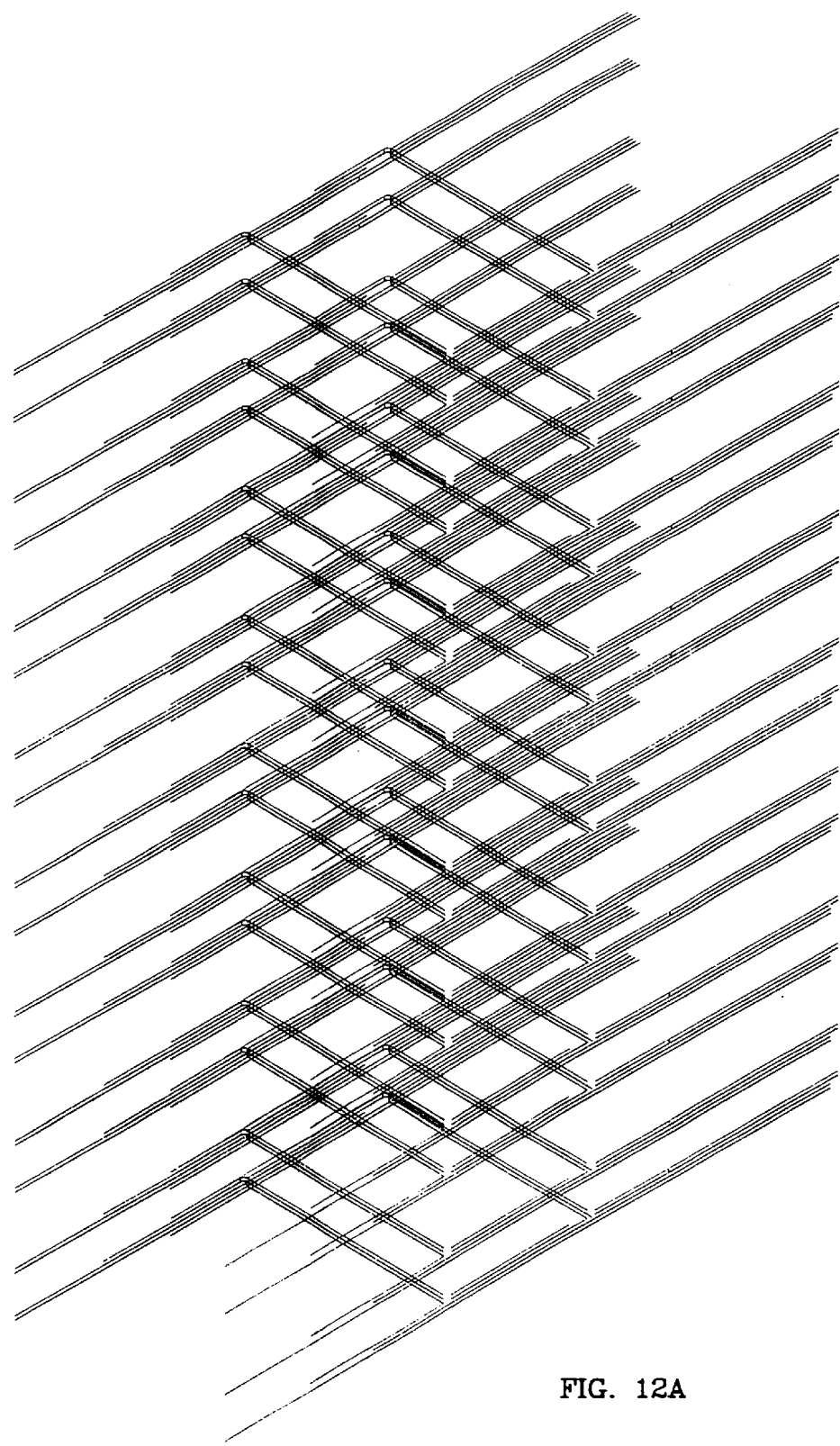
FIG. 12, consisting of FIGS. 12a and 12b, show the connections of, and to, flat flexible multiconductor cables at their most dense (for the 4096-port switch) located between panels three and four.
Figure 12B:
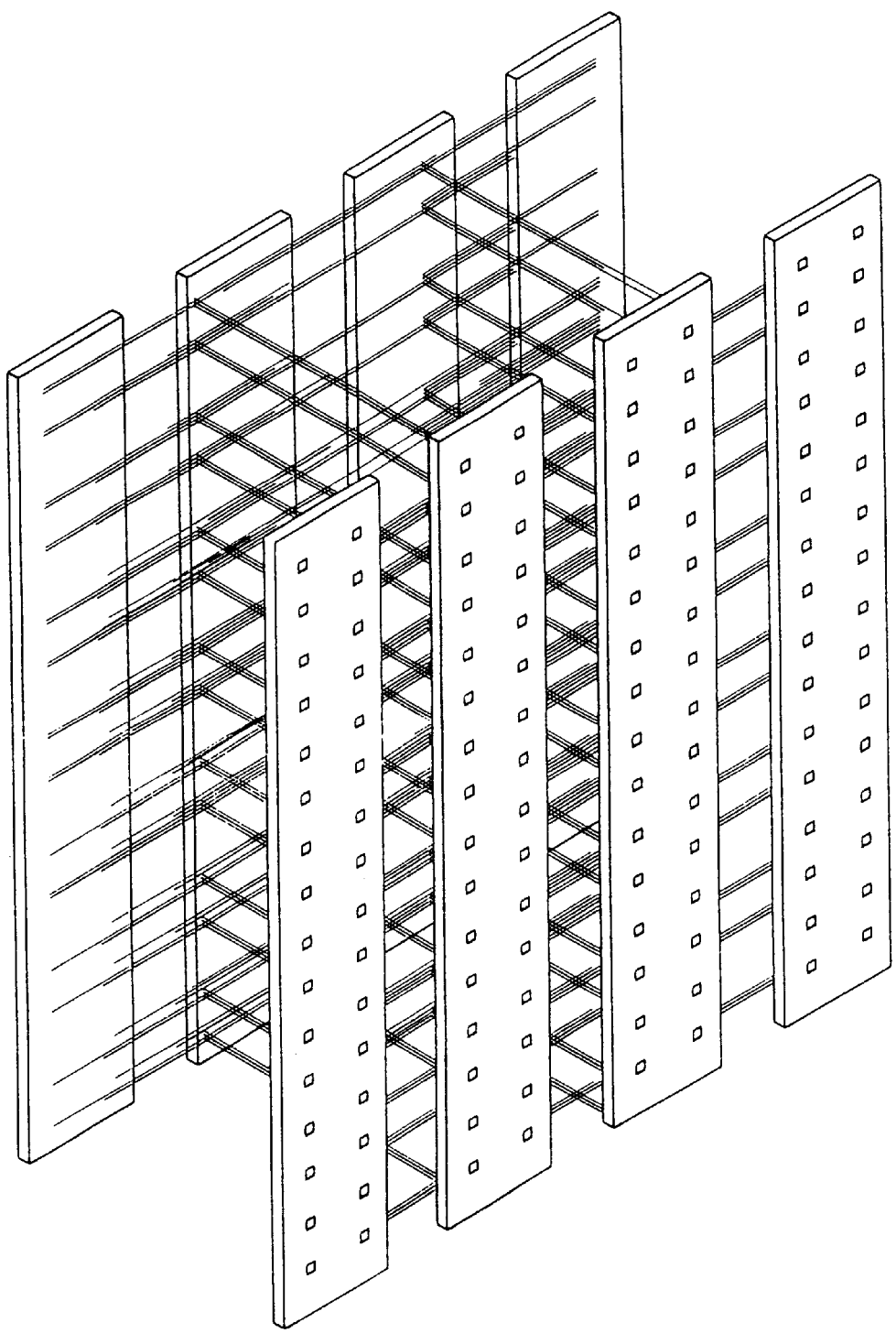

Extending the concept that there is more to FIG. 10 than "meets the eye", connections of the flat flexible multiconductor cables at their most dense are shown in FIG. 12, consisting of FIGS. 12a and 12b. For the case of a 4096-port switch this is between panels three and four, and FIG. 12 so illustrates. All flexible cables between panels connect pads on opposing panels either straight up-or-down or left-or-right of each other. One routed species of flexible printed circuit wiring cable—for example, the "yellow" flexible printed circuit wiring—connects to complimentary pads—i.e., the "yellow" pads—on the tiles. The longitudinal path for flexible cables that connect left-right runs above the surface, and crosses between panels in the middle. Conversely the longitudinal paths for flexible cables that connect up-down runs equidistant from the panels, and connects to pads on either side. (almost) directly over the pad. Another species of flexible printed circuit wiring cable routing—the "blue" species if you will—runs straight across between panels. This species of flexible printed circuit wiring cable routing, and connections, are not shown in FIG. 12A. The reader should locate this species of interconnection routing in FIG. 10. Regular slots, 3" wide, allow extraction and replacement of 2.5" wide tiles or failed flexible cables.

Tiles to which the flexible cables connects are shown in FIG. 12b without the panel frame that holds, powers and cools the tiles. Again, only a single species of the routed flexible cable (the "yellow" flexible cable, as is were) is shown. The entire assembly consists of regular subassemblies of identical parts. This keeps unit costs for flexible cable low and allows progressive agglomerations of flexible cables to be assembled separately from the panels, to be clipped on together during final assembly. These subassemblies may use "barrettes" to hold the flexible printed circuit wiring in the rigorously prescribed patterns, but permit individual flexible cables to be replaced without disconnecting others.

The flexible printed circuit wiring cables that are quite compactly, and rigorously, routed in accordance with the present invention are also compactly and reliably terminated. They are so terminated by a universal flat connector that, depending upon the geometry at which it is plugged to a panel (by the quite simple expedient of having each of its two prongs slip a corresponding hole within the panel), alternatively serves to connect all the exposed conductor ends of the flexible multiconductor cables that may approach the panel, and bend over onto and against pads that are upon the panel, in each of two planes. To say again, one connector—and a quite simple one at that—suffices, in combination with panel pad geometries and affixation features, to connect incoming/outgoing flat multiconductor signal cable that is within each of two orthogonal planes.

The spring clip of the present invention is shown in isolation in FIG. 13a. It is shown holding a flexible multiconductor cable, to a tile in FIG. 13b. To maintain the even pressure between contacts on the rigid conductor ends of the flexible cables and pads on the surface of tiles, the spring clips attached to anchor points hold flexible cables to tiles. Small ridges (not shown) around the 200 mil square pads on the surface of tiles hold the connecting flexible cables so that the 12 mil contacts align.

4. Summary

The optimized layered network topology of the related invention, combined with the SCI protocol and with the multi-layer switching network packaging geometry of the present invention, present an attractive approach to communication among a large number of processors, providing all requisite bandwidth, latency, and scaling characteristics. Issues of routing, fault handling and internal switch contention are managed routinely by switch hardware.

4.1 Scale of Switches, or Switching Networks, Imminently Constructable By Use of the Present Invention For a switching network of a logical design so supporting, the (1) geometry and (2) spring clip connector of the present invention support, in combination, the full non blocking interconnection of, by way of example, 4096 communication ports in 1536 switching modules bearing 24,576 switching chips by 50,688 ribbon-cable-to-switching-module connections all located within a cube of 64 inch dimension with no port-to-port electrical path longer than about 38 inches. If each port is, for example, 64 bits wide, or 64 data lines plus 64 ground lines, then the 50,688 ribbon cable connections efficiently and economically handle some 6,488,064 signal and ground path connections within a volume of approximately 151 cubic feet. At a 500 MHz clock, switch latency is 168 ns and switch data transfer capacity is 2 gigabytes/second, reasonably supporting packet-switched self-routing non-blocking interconnection of 4096 processors each of 6 gigaFLOP/second speed, for a total computational capability of 24 teraFLOP/second.

4.2 Affordability

The scalability of the switching network of the present invention is one measure of its affordability. Its active logic scales with $O(N \log_2 N)$, which is the theoretical minimum for a switch with equal latency to all destinations. The number of switchpoints, and the number of interconnection wires both scale at this rate. The length of the interconnection wires scales with the square root of N, which is the minimum for a switch organized as a two-dimensional array.

The other measure of affordability is the cost of components. Switchpoints and tiles being more expensive than typical commercially packaged components in order to minimize flexible printed circuit wiring length and speed-of-light delays, it is worthwhile to minimize the space they consume. Although the flexible cables are individually simple and cheap, when thousands are used then assembly may be problematic. However, during the course of building a large switch, costs associated with tiles and flexible cable are expected to decrease substantially.

The cost of the switching network will desirably not become dominant over the cost of the processors connected to the switch. This may be seen by associating a row of switchpoints with each pair of ports, and comparing the half dozen parts in that row with the number of parts (for example, the components of the 4 GByte memory) in the nodes attached to that pair of ports.

In accordance with the preceding explanation, variations and adaptations of the geometries and/or connectors in accordance with the present invention will suggest themselves to a practitioner of the digital switch, and switching network, architecture and manufacturing design arts.

In accordance with these and other possible variations and adaptations of the present invention, the scope of the invention should be determined in accordance with the following claims, only, and not solely in accordance with that embodiment within which the invention has been taught.

What is claimed is:

1. A method of electrically connecting at and to a substrate located in a first, Z, plane each of plural planar flexible multiconductor cables where at least one of the cables is located in a second, X, plane and where at least another one of the cables is located in a third, Y, plane where the planes X, Y and Z are everywhere perpendicular to each other, the method of electrically connecting plural planar multiconductor cables located in perpendicular planes comprising:

exposing the conductor ends of each planar multiconductor cable;

at a location at or before the exposed conductor ends of each planar cable, bending the planar cable perpendicular, making a portion of the cable closest to its exposed conductors' ends called the bent portion;

arraying electrically conductive pads on the substrate to lie along a straight line in the first, Z, plane which line is at a 45° diagonal both to the second, X, plane and to the third, Y, plane, the separation of the pads in both (i) a direction of the intersection of the first, Z, plane and the second, X, plane, and also in (ii) a direction of the intersection of the first, Z, plane and the third, Y, plane, corresponding to a separation of conductors within each multiconductor cable; and placing the exposed conductor ends of each cablel's bent end portion, whether a remaining, non-bent-end portion of the associated ribbon cable lies in the second, X, plane or in the third, Y, plane, to lie against some associated ones of the pads lying along the diagonal straight line; and making electrical connection between a first pattern of connectable points the multiple conductors of each cable and a compatible second pattern of connection points at a proximately located associated one of the pads;

wherein connection to pads lying along a diagonal line permits, inter alia, that electrical connection in the Z plane may be realized to electrical cables, duly bent, extending in both X and in Y planes.

2. The method of electrically connecting plural planar flexible multiconductor cables located in perpendicular planes according to claim 1 wherein a first pattern of connectible points of the exposed conductor ends on each and all of the multiconductor cables is not only compatible with a second pattern of connection points at a proximately located associated one of the pads, as is necessary to permit electrical connection at all, but the first pattern also exhibits 90° rotational symmetry to the second pattern, and vice versa, making that a cable extending in either an X, or a Y, plane may be connected to pads of the same geometry;

wherein the connection geometry at the pads upon the substrate in the Z plane is regular and orderly no matter whether a connected multiconductor cable extends in the X, or in the Y, plane.

3. The method of electrically connecting plural planar flexible multiconductor cables located in perpendicular planes according to claim 1 further comprising:

holding the exposed conductor ends of each cable against its associated portion of the pads under spring force.

4. The method of electrically connecting plural planar flexible multiconductor cables located in perpendicular planes according to claim 3 wherein the holding of the exposed wire conductor of each cable against its associated portion of the pads under spring force comprises:

mounting a spring clip to the substrate in position over the exposed conductor ends of each cable, and over a portion of the pads associated with the exposed conductor ends of each cable, so as to force the exposed conductor ends of each cable against its associated portion of the pads, making pressured electrical connection between the conductor ends and the pads.

5. An electrical interconnection between a substrate located in a first, Z, plane and exposed conductor ends of each of two planar flexible multiconductor cables one of which flexible multiconductor cables is located in a second, X, plane and the other one of which flexible printed circuit cables is located in a third, Y, plane where the planes X, Y and Z are everywhere perpendicular to each other, the cables-to-substrate electrical interconnection geometry CHARACTERIZED IN THAT end regions of the planar flexible multiconductor cable located in the second, X, plane, and also the planar flexible multiconductor cable located in the third, Y, plane, are both respectively bent perpendicular out of the X plane, and out of the Y plane, so the exposed conductor ends of the end regions of each cable lie against the substrate and over pad regions in the first, Z, plane;

electrically conductive pad regions on the substrate are arrayed to lie along a straight line in the first, Z, plane which line is at a 45° diagonal both to the second, X, plane and to the third, Y, plane, the separation of the pads in both (i) a direction of the intersection of the first, Z, plane and the second, X, plane, and also in (ii) a direction of the intersection of the first, Z, plane and the third, Y, plane, corresponding to a separation of conductors within each multiconductor cable;

electrically connectible points at pad regions are in a pattern having a 90° rotational symmetry to a like pattern of exposed conductors at the end of each multiconductor cable; and electrical connection is made between the pattern of exposed conductor ends of each cable, whether a cable the unbent portion of which lies in the second, X, plane or a cable the unbent portion of which lies in the third, Y, plane, and a corresponding pattern of connectible points on some associated portion of the pads that lie along the diagonal straight line;

wherein pads lying along the diagonal straight line in the first, Z, plane of a substrate suffice to connect both flexible multiconductor cables located both in a second, X, plane, and also in a third, Y, plane; and wherein, because of 90° rotational symmetry between connectible exposed conductor end points and substrate pad points, the connections of cables, duly bent, located in both the second, X, plane and also in the third, Y, plane is straight on, with no bending nor any torsioning of any cable despite that cables extend in different perpendicular planes.

6. The cables-to-substrate electrical interconnection geometry according to claim 5 FURTHER CHARACTERIZED IN THAT a spring clip is mounted to the substrate in position over the exposed conductor ends of each cable, and over a portion of the pads associated with the exposed conductor ends of each ribbon cable, so as to force the exposed conductor ends of each cable against its associated portion of the pads, therein making pressured electrical connection between the exposed conductor ends and the pads.

7. A connector suitable to connect a flat multiconductor cable to a staircase pattern of conductive pads, spaced to separation in the direction of each of two imaginary perpendicular axis equal with a separation between conductors within the cable, upon a substrate, the multiconductor-cable-to-conductive-pads connector comprising:

a spring clip in the shape substantially of a square of substantially planar material, one diagonal of the substantial square subtending the staircase pattern of conductive pads, having mounting features, suitable to mount the substantially planar material to the substrate, that are located at opposite corners of the substantial square along its other, remaining, diagonal;

wherein the spring clip when mounted to the substrate provides by action of its mounting features a spring force against the substrate over its substantially square area;

wherein when electrically conductive conductor ends of a multiconductor cable are placed between the spring clip and the substrate from a direction perpendicular to any side of the substantial square, and when the spring clip is mounted to the substrate, then these conductive ends are held by spring force in electrical contact with the conductive pads arrayed in the staircase pattern;

wherein no interference is presented to the electrical contact between the ribbon cable's conductive ends and the substrate's conductive pads by the mounting features of the spring clip.

8. The multiconductor-cable-to-conductive-pads connector according to claim 7 wherein the spring clip's mounting features comprise:

tabs anchored within complimentary holes within the substrate.

9. The multiconductor-cable-to-conductive-pads connector according to claim 7 wherein the spring clip is selectively mountable, de-mountable, and re-mountable in its position holding by spring force the cable's conductive ends in electrical contact with the substrate's conductive pads.

10. In an electrical device having electrical circuitry on each of at least two spaced-parallel panels located in a set of parallel planes called the planes of Z electrically connected by flat flexible multiconductor cables routed through free space between the spaced-parallel panels, the improvement wherein the routed flat flexible multiconductor cables comprise:

a multiplicity of flat flexible multiconductor cables of a first group, each of which cables extends between pads upon adjacent panels, routed between pads upon adjacent panels, (i) in a first plane of Z proximately to one adjacent panel along an axis formed by intersection of one of a set of parallel planes, called the planes of X, with a plane of Z, and then (ii) bending 90°, routed in a respective one plane of a set of parallel planes called the planes of Y along an axis formed by the intersection of the same one plane of X now with the one plane of Y, and then (iii) bending 90°, in a second plane of Z proximately to the other adjacent panel along an axis formed by intersection of the same one plane of X now with the second plane of Z, (iv) wherein cables of this first group are routed in a first associated plane of Z, a single associated plane of Y between panels, and a second associated plane or Z, all the while along axis formed by intersection of a single plane of X;

a multiplicity of flat flexible multiconductor cables of a second group, each of which also extends between pads on adjacent panels, routed between pads upon adjacent panels (i) in a first plane of Z at one of the adjacent panels along an axis formed by intersection of the plane of Z with one of the planes of Y, and then (ii) bending 90°, in a first plane of X along an axis formed by intersection of this first plane of X with the one plane of Y, and then (iii) bending 90°, in a second plane of Z that is parallel to the planes of Z where reside the panels but that is located between the adjacent panels, this routing in this second plane of Z being along an axis formed by intersection of this second plane of Z and the one plane of Y, and then (iv) bending 90°, in a second plane of X along an axis formed by intersection of this second plane of X with the one plane of Y, and then, (v) bending 90°, in a third plane of Z at the adjacent panel, this routing being along a Y axis formed by intersection of the third plane of Z with the one plane of Y, (vi) wherein cables of this second group are routed in a first associated plane of Z, in a first associated plane of X, in a second associated plane of Z, in a second associated plane of X, and in a third associated plane of Z, all the while along axis formed by intersection of a single plane of Y;

wherein all the planes of X are everywhere perpendicular to all the planes of Y are everywhere perpendicular to all the planes of Z;

wherein because (i) all cables of the first group are exclusively routed in planes of Z and Y, and (ii) each ribbon cable of the second group is routed only in planes of X and Z, a cable of the first group never cuts, nor crosses, a cable of the second group, and vice versa.

11. The improvement to the routing of flat flexible multiconductor cables in an electrical device according to claim 10 wherein electrical connection is made between (i) exposed conductor ends bent 90° of the cables of both groups and (ii) conductive pads on the panels, which conductive pads lie along a straight line in an associated one of the planes of Z in which is present the associated panel, and which line is at a 45° diagonal both to the planes of X and the planes of Y.

12. The improvement to the routing of flat flexible multiconductor cables in an electrical device according to claim 10 wherein electrical connection is made to electrically connectible points at pad regions which points are in a pattern having a 90° rotational symmetry to a like pattern of exposed conductors at the end of each multiconductor cable;

wherein, because of 90° rotational symmetry between connectible exposed conductor end points and substrate pad points; the connections of cables, duly bent, located in both second, X, planes and also in third, Y, planes is straight on in the Z planes, with no bending nor any torsioning of any cable despite the fact that cables of the same group extend in two different perpendicular planes, and cable of both groups extend in three different perpendicular planes.

13. The improvement to the routing of flat flexible multiconductor cables in an electrical device according to claim 10 wherein the second plane of Z in which is routed the multiplicity of cables of a second group is located approximately midway between the two adjacent panels each of which is on a respective one of the planes of Z.

14. A layered switching network comprising:

switching chips in double-sided panels spaced-parallel in associated ones of parallel planes of Z;

flat flexible printed circuit cables of a first group routed between the panels in associated ones of two parallel planes of Z and one plane of Y;

flat flexible printed circuit cables of a second group routed between the panels in associated one of three parallel planes of Z, and two planes of X; and electrical connectors connecting the cables of both groups to the switching chips upon the panels;

wherein all the planes of X are everywhere perpendicular to all the planes of Y are everywhere perpendicular to all the planes of Z;

wherein each ribbon cable of the first group is everywhere in its extension in a plane of Y routed between an associated pair of the planes of X;

wherein each ribbon cable of the second group is everywhere in its extension in a plane of X routed between an associated pair of the planes of Y; and whereby a ribbon cable of the first group never cuts, nor crosses, a ribbon cable of the second group, and vice versa.

15. The layered switching network according to claim 14 wherein the electrical connectors comprise:

exposed conductor ends of the flat flexible cables of both groups bent 90°;

conductive pads on the panels, which conductive pads lie along a straight line in an associated one of the planes of Z in which is present the associated panel, and which line is at a 45° diagonal both to the planes of X and the planes of Y; and circuit traces upon the panel electrically connecting the pads to the switching chips.

* * * * *